US007970648B2

(12) United States Patent
Gailey et al.

(10) Patent No.: US 7,970,648 B2
(45) Date of Patent: Jun. 28, 2011

(54) ADVERTISING CAMPAIGN AND BUSINESS LISTING MANAGEMENT FOR A LOCATION-BASED SERVICES SYSTEM

(75) Inventors: Michael L. Gailey, Dunwoody, GA (US); Eric A. Portman, Norcross, GA (US); Michael J. Burgiss, Smyrna, GA (US); Chad S. Holmes, Atlanta, GA (US); Angela King Smith, Atlanta, GA (US)

(73) Assignee: Accenture Global Services Limited, Dublin (IE)

( * ) Notice: Subject to any disclaimer, the term of this patent is extended or adjusted under 35 U.S.C. 154(b) by 1695 days.

(21) Appl. No.: 10/133,536

(22) Filed: Apr. 26, 2002

(65) Prior Publication Data

US 2002/0161646 A1 Oct. 31, 2002
US 2005/0027590 A9 Feb. 3, 2005

Related U.S. Application Data

(63) Continuation-in-part of application No. 09/946,111, filed on Sep. 4, 2001, now Pat. No. 6,994,447.
(60) Provisional application No. 60/286,916, filed on Apr. 27, 2001.

(51) Int. Cl.
*G06Q 30/00* (2006.01)
(52) U.S. Cl. ............... 705/14.49; 705/14.58; 455/414.1
(58) Field of Classification Search ............ 705/14; 455/414
See application file for complete search history.

(56) References Cited

U.S. PATENT DOCUMENTS

| | | | |
|---|---|---|---|
| 4,586,160 A | 4/1986 | Amano et al. | 364/900 |
| 4,791,281 A | 12/1988 | Johnsen et al. | 235/383 |
| 5,343,493 A | 8/1994 | Karimullah | 375/1 |
| 5,559,707 A * | 9/1996 | DeLorme et al. | 701/200 |
| 5,625,668 A | 4/1997 | Loomis et al. | |
| 5,652,570 A | 7/1997 | Lepkofker | 340/573 |
| 5,663,734 A | 9/1997 | Krasner | 342/357 |
| 5,682,525 A * | 10/1997 | Bouve et al. | 707/104.1 |
| 5,717,923 A | 2/1998 | Dedrick | |
| 5,752,232 A | 5/1998 | Basore et al. | 704/275 |
| 5,757,232 A | 5/1998 | Hosoya | 330/252 |
| 5,764,731 A | 6/1998 | Yablon | 379/216 |

(Continued)

FOREIGN PATENT DOCUMENTS

EP 0 837 406 A2 4/1998

(Continued)

OTHER PUBLICATIONS

"CellPoint continues to strengthen its position in the location services and telematics markets," M2 Presswire, Oct. 4, 2000.*

(Continued)

*Primary Examiner* — C. M Tarae
(74) *Attorney, Agent, or Firm* — Brinks Hofer Gilson & Lione

(57) ABSTRACT

The present invention discloses a method and system for creating advertising content and business listing content in a location-based services system. An advertising campaign or a business listing is created with a business remote terminal using a campaign management interface application or a business profile interface application. The advertising campaign or business listing is then transmitted to an advertiser portal. The advertiser portal then directs the advertising campaign or business listing to a create campaign application or a business profile application for processing. The advertising campaign or business listing is then stored in a business database or a business profile database using a data access component.

44 Claims, 3 Drawing Sheets

U.S. PATENT DOCUMENTS

| | | |
|---|---|---|
| 5,774,860 A | 6/1998 | Bayya et al. .................. 704/275 |
| 5,794,204 A | 8/1998 | Miyazawa et al. ............ 704/275 |
| 5,794,235 A | 8/1998 | Chess ................................ 707/5 |
| 5,804,803 A | 9/1998 | Cragun et al. ................. 235/375 |
| 5,809,471 A | 9/1998 | Brodsky ....................... 704/275 |
| 5,860,063 A | 1/1999 | Gorin et al. .................... 704/257 |
| 5,898,680 A | 4/1999 | Johnstone et al. ............ 370/316 |
| 5,905,246 A | 5/1999 | Fajkowski .................... 235/375 |
| 5,924,070 A | 7/1999 | Ittycheriah et al. ............ 704/275 |
| 5,963,940 A | 10/1999 | Liddy et al. ........................ 707/5 |
| 6,014,090 A | 1/2000 | Rosen et al. ................... 340/905 |
| 6,016,426 A | 1/2000 | Bodell ......................... 455/422 |
| 6,049,711 A | 4/2000 | Ben-Yehezkel et al. ....... 455/414 |
| 6,073,112 A * | 6/2000 | Geerlings ........................ 705/14 |
| 6,076,099 A | 6/2000 | Chen et al. |
| 6,091,956 A | 7/2000 | Hollenberg |
| 6,112,174 A | 8/2000 | Wakisaka et al. .............. 704/251 |
| 6,125,342 A | 9/2000 | Selesky ............................ 704/9 |
| 6,157,705 A * | 12/2000 | Perrone .................... 379/88.01 |
| 6,167,255 A | 12/2000 | Kennedy, III et al. ......... 455/414 |
| 6,181,927 B1 | 1/2001 | Welling, Jr. et al. .......... 455/414 |
| 6,185,535 B1 | 2/2001 | Hedin et al. ................... 704/270 |
| 6,195,641 B1 | 2/2001 | Loring et al. ................. 704/275 |
| 6,199,099 B1 | 3/2001 | Gershman et al. |
| 6,202,023 B1 * | 3/2001 | Hancock et al. .............. 701/201 |
| 6,219,696 B1 * | 4/2001 | Wynblatt et al. .............. 709/218 |
| 6,233,559 B1 | 5/2001 | Balakrishnan ................ 704/275 |
| 6,236,977 B1 * | 5/2001 | Verba et al. ..................... 705/10 |
| 6,243,684 B1 | 6/2001 | Stuart et al. ................... 704/275 |
| 6,246,672 B1 | 6/2001 | Lumelsky ..................... 370/310 |
| 6,250,557 B1 | 6/2001 | Forslund et al. .............. 235/492 |
| 6,301,480 B1 | 10/2001 | Kennedy, III et al. ......... 455/445 |
| 6,301,560 B1 | 10/2001 | Masters ........................ 704/251 |
| 6,308,151 B1 | 10/2001 | Smith ........................... 704/235 |
| 6,317,718 B1 | 11/2001 | Fano |
| 6,332,127 B1 | 12/2001 | Bandera et al. ................. 705/14 |
| 6,336,098 B1 | 1/2002 | Fortenberry et al. ............ 705/14 |
| 6,353,398 B1 | 3/2002 | Amin et al. ................... 340/995 |
| 6,360,167 B1 * | 3/2002 | Millington et al. ............ 701/211 |
| 6,370,514 B1 | 4/2002 | Messner |
| 6,400,956 B1 | 6/2002 | Richton ........................ 455/456 |
| 6,408,307 B1 * | 6/2002 | Semple et al. ............... 707/104.1 |
| 6,418,199 B1 | 7/2002 | Perrone ...................... 379/88.01 |
| 6,418,216 B1 | 7/2002 | Harrison et al. ........... 379/208.01 |
| 6,424,945 B1 | 7/2002 | Sorsa .......................... 704/270.1 |
| 6,427,115 B1 | 7/2002 | Sekiyama ..................... 701/208 |
| 6,434,524 B1 | 8/2002 | Weber .......................... 704/257 |
| 6,434,526 B1 | 8/2002 | Cilurzo et al. .............. 704/270.1 |
| 6,452,498 B2 * | 9/2002 | Stewart ....................... 340/573.1 |
| 6,460,036 B1 | 10/2002 | Herz |
| 6,466,796 B1 | 10/2002 | Jacobson et al. .............. 455/456 |
| 6,466,899 B1 | 10/2002 | Yano et al. ........................ 704/1 |
| 6,493,671 B1 | 12/2002 | Ladd et al. .................... 704/270 |
| 6,501,833 B2 | 12/2002 | Phillips et al. .............. 379/88.07 |
| 6,502,076 B1 | 12/2002 | Smith ............................. 705/10 |
| 6,505,046 B1 | 1/2003 | Baker ........................... 455/456 |
| 6,510,417 B1 | 1/2003 | Woods et al. ................. 704/275 |
| 6,513,052 B1 | 1/2003 | Binder |
| 6,535,743 B1 | 3/2003 | Kennedy, III et al. ......... 455/456 |
| 6,535,854 B2 | 3/2003 | Buchner et al. ............... 704/275 |
| 6,560,456 B1 | 5/2003 | Lohtia et al. .................. 455/445 |
| 6,606,745 B2 | 8/2003 | Maggio |
| 6,609,005 B1 | 8/2003 | Chern ........................... 455/457 |
| 6,614,885 B2 | 9/2003 | Polcyn ....................... 379/88.02 |
| 6,647,257 B2 | 11/2003 | Owensby .................... 455/414.1 |
| 6,677,894 B2 | 1/2004 | Sheynblat et al. ........... 342/357.1 |
| 6,731,940 B1 | 5/2004 | Nagendran ................ 455/456.1 |
| 6,748,418 B1 | 6/2004 | Yoshida et al. ............... 709/204 |
| 6,757,544 B2 | 6/2004 | Rangarajan et al. ........ 455/456.1 |
| 6,760,426 B2 | 7/2004 | Sbisa et al. ................ 379/221.09 |
| 6,792,096 B2 | 9/2004 | Martin et al. ............ 379/218.01 |
| 6,813,499 B2 | 11/2004 | McDonnell et al. ........ 455/456.1 |
| 6,834,195 B2 | 12/2004 | Brandenberg et al. |
| 6,847,825 B1 | 1/2005 | Duvall et al. ................ 455/456.3 |
| 6,848,542 B2 | 2/2005 | Gailey et al. |
| 6,850,766 B2 | 2/2005 | Lau et al. .................... 455/456.1 |
| 6,859,777 B2 | 2/2005 | Krasle ....................... 704/270.1 |
| 6,898,571 B1 | 5/2005 | Val et al. |
| 6,901,366 B1 | 5/2005 | Kuhn et al. ................... 704/275 |
| 6,907,119 B2 | 6/2005 | Case et al. ................ 379/218.01 |
| 6,937,986 B2 | 8/2005 | Denenberg et al. ........... 704/275 |
| 6,937,995 B1 | 8/2005 | Kepecs .......................... 705/14 |
| 6,944,447 B2 | 9/2005 | Portman et al. ............. 455/422.1 |
| 6,961,706 B2 | 11/2005 | Saito ............................ 704/275 |
| 6,968,513 B1 | 11/2005 | Rinebold et al. .............. 715/854 |
| 6,970,830 B1 * | 11/2005 | Samra et al. ..................... 705/10 |
| 6,993,326 B2 * | 1/2006 | Link et al. .................. 455/414.1 |
| 6,996,531 B2 | 2/2006 | Korall et al. .................. 704/270 |
| 7,006,983 B1 | 2/2006 | Packes, Jr. et al. .............. 705/14 |
| 7,013,148 B1 | 3/2006 | Ganesh ...................... 455/456.1 |
| 7,020,609 B2 | 3/2006 | Thrift et al. ................ 704/270.1 |
| 7,028,072 B1 | 4/2006 | Kliger et al. .................. 709/203 |
| 7,050,816 B2 | 5/2006 | Fukui et al. ................ 455/456.1 |
| 7,050,977 B1 | 5/2006 | Bennett ...................... 704/270.1 |
| 7,069,238 B2 | 6/2006 | I'Anson et al. ................. 705/26 |
| 7,089,264 B1 | 8/2006 | Guido et al. ................ 707/104.1 |
| 7,130,630 B1 | 10/2006 | Enzmann et al. ........... 455/435.1 |
| 7,233,655 B2 | 6/2007 | Gailey et al. .............. 379/210.01 |
| 7,245,910 B2 | 7/2007 | Osmo .......................... 455/432.1 |
| 7,254,384 B2 | 8/2007 | Gailey et al. ................. 455/412 |
| 7,336,942 B2 | 2/2008 | Wang ......................... 455/404.2 |
| 7,343,317 B2 * | 3/2008 | Jokinen et al. .................. 705/14 |
| 7,376,586 B1 * | 5/2008 | Partovi et al. ................... 705/26 |
| 7,412,260 B2 | 8/2008 | Gailey et al. ................. 455/563 |
| 7,437,295 B2 | 10/2008 | Pitts, III et al. ............... 704/275 |
| 7,441,016 B2 | 10/2008 | Gailey et al. ................. 709/219 |
| 7,472,091 B2 | 12/2008 | Gailey et al. ................... 705/51 |
| 7,526,278 B2 * | 4/2009 | Link et al. .................. 455/414.1 |
| 7,640,006 B2 | 12/2009 | Portman et al. ............. 455/412.1 |
| 7,698,228 B2 | 4/2010 | Gailey et al. ................... 705/64 |
| 2001/0044309 A1 | 11/2001 | Bar et al. |
| 2001/0053999 A1 | 12/2001 | Feinberg ........................ 705/14 |
| 2002/0004745 A1 * | 1/2002 | Bascobert et al. .............. 705/14 |
| 2002/0029172 A1 | 3/2002 | I'Anson et al. ................. 705/26 |
| 2002/0035474 A1 * | 3/2002 | Alpdemir ..................... 704/270 |
| 2002/0035568 A1 * | 3/2002 | Benthin et al. ................. 707/102 |
| 2002/0036654 A1 | 3/2002 | Evans et al. ................... 345/744 |
| 2002/0040297 A1 | 4/2002 | Tsiao et al. ................... 704/257 |
| 2002/0046084 A1 | 4/2002 | Steele et al. |
| 2002/0046104 A1 * | 4/2002 | Kaddeche et al. .............. 705/14 |
| 2002/0049644 A1 | 4/2002 | Kargman ....................... 705/26 |
| 2002/0090934 A1 | 7/2002 | Mitchelmore |
| 2002/0103698 A1 * | 8/2002 | Cantrell ......................... 705/14 |
| 2002/0107027 A1 * | 8/2002 | O'Neil ......................... 455/456 |
| 2002/0133477 A1 | 9/2002 | Abel |
| 2002/0143550 A1 | 10/2002 | Nakatsuyama ............ 704/270.1 |
| 2002/0143638 A1 | 10/2002 | August et al. .................. 705/26 |
| 2002/0143639 A1 | 10/2002 | Beckett et al. .................. 705/26 |
| 2002/0160772 A1 | 10/2002 | Gailey et al. ................. 455/428 |
| 2002/0161587 A1 | 10/2002 | Pitts, III et al. ............... 704/276 |
| 2002/0161625 A1 * | 10/2002 | Brito-Valladares et al. ..... 705/10 |
| 2002/0161647 A1 | 10/2002 | Gailey et al. |
| 2002/0164977 A1 * | 11/2002 | Link II et al. ................. 455/414 |
| 2002/0166127 A1 | 11/2002 | Hamano et al. |
| 2003/0023440 A1 | 1/2003 | Chu ............................. 704/249 |
| 2003/0032409 A1 | 2/2003 | Hutcheson et al. ............ 455/414 |
| 2003/0041050 A1 * | 2/2003 | Smith et al. ....................... 707/1 |
| 2003/0065620 A1 | 4/2003 | Gailey et al. ................... 705/51 |
| 2003/0065749 A1 | 4/2003 | Gailey et al. ................. 709/219 |
| 2003/0135853 A1 | 7/2003 | Goldman et al. ............... 725/34 |
| 2003/0154126 A1 | 8/2003 | Gehlot et al. |
| 2003/0182131 A1 | 9/2003 | Arnold et al. ................. 704/275 |
| 2004/0166832 A1 | 8/2004 | Portman et al. ............. 455/412.1 |
| 2005/0102180 A1 | 5/2005 | Gailey et al. |
| 2008/0270224 A1 | 10/2008 | Portman et al. ................. 705/10 |
| 2009/0083290 A1 | 3/2009 | Gailey et al. ................... 707/10 |
| 2009/0098862 A1 | 4/2009 | Gailey et al. ............... 455/414.1 |

FOREIGN PATENT DOCUMENTS

| | | |
|---|---|---|
| JP | 11-046193 | 2/1999 |
| JP | 11-065434 | 3/1999 |
| JP | 11-069404 | 3/1999 |
| JP | 2000-067047 | 3/2000 |
| JP | 2000-268042 | 9/2000 |
| JP | 2001-004387 | 1/2001 |
| JP | 2001-005483 | 1/2001 |
| JP | 2001-014252 | 1/2001 |

| | | |
|---|---|---|
| JP | 2001-043479 | 2/2001 |
| JP | 2001-057593 | 2/2001 |
| JP | 2001-101000 | 4/2001 |
| JP | 2001-516905 | 10/2001 |
| JP | 2002-536755 | 10/2002 |
| KR | 1999-0082755 | 11/1999 |
| WO | WO 97/50002 | 12/1997 |
| WO | WO 98/49641 A1 * | 11/1998 |
| WO | WO 99/14743 | 3/1999 |
| WO | WO 99/62013 A1 * | 12/1999 |
| WO | WO 00/21232 | 4/2000 |
| WO | WO 00/29982 | 5/2000 |
| WO | WO 00/46792 | 8/2000 |
| WO | WO 01/26393 A1 | 4/2001 |

OTHER PUBLICATIONS

Hamblen, Matt. "Ensuring Portable Privacy," Computerworld, Dec. 11, 2000.*

James, Dana. "It'll be a wireless, wireless, wireless, wireless, wireless world," Marketing News, Jul. 17, 2000.*

McGinity, Meg. "Surfing your turf," Association for Computing Machinery. Communications of the ACM, Apr. 2000.*

Nobel et al. "Wireless service hits snags—Location-based advertisers for wireless devices must rethink strategies to spur customer adoption," eWeek, Dec. 18, 2000.*

"The Risks Digest," ACM Committee on Computers and Public Policy, Peter G. Neumann, moderator, vol. 21, Issue 5, Sep. 2000, http://catless.ncl.ac.uk/Risks/21.05.html.

Akiyama, T., Niwa, M., Watanabe, M., Tomikashi, M., Konishi, T., Itoh, Y., "Constructing a Natural Language Interface of Car Navigation Systems," Collection of Reports Produced to the Information Processing Academy, vol. 99, No. ITS-2, pp. 53-60, published by the Information Processing Academy on Jun. 3, 1999; (Translation—Abstract only).

Google definitions of "server" downloaded May 31, 2009, http://www.google.com/search?sourceid=navclient&ie=UTF-8&oe=utf-8&q=define%3A+server (1 of 2) May 31, 2009 and http://www.google.com/search?sourceid=navclient&ie=UTF-8&oe=UTF-8&q=define%3A+server (2 of 2) May 31, 2009.

Google definitions of "gateway," downloaded Dec. 6, 2009, 2 pgs., http://www.google.com/search?sourceid=navclient&ie=UTF-8&oe=UTF-8&q=define%3A+gateway.

Google definitions of "advertising campaign," downloaded Dec. 7, 2009, 1 pg., http://www.google.com/search?sourceid=navclient&ie=UTF-8&oe=UTF-8&q=define%3A+advertising+campaign.

Google definitions of "business rule," downloaded Dec. 12, 2009, 1 pg., http://www.google.com/search?sourceid=navclient&ie=UTF-8&oe=UTF-8&q=define%3A+business+rule.

Google definitions of "probability," downloaded Dec. 12, 2009, 2 pgs., http://www.google.com/search?sourceid=navclient&ie=UTF-8&oe=UTF-8&q=define%3A+probability.

Google search for definitions of "data scoring," downloaded Dec. 13, 2009, 1 pg., http://www.google.com/search?sourceid=navclient&ie=UTF-8&oe=UTF-8&q=define%3A+Data+scoring.

Nakajima, T., "Review of Web Sites, Goal Being Sites Easy to Use for User," Nikkei Internet Technology, Nikkei Business Publications, Inc., Japan, Oct. 22, 2000, vol. 40, pp. 122-139. (with concise explanation of relevance in English).

Shirai, H., Yokoyama, K., Sudo, M., Hakomori, S., Inoue, U., "Design and Implementation of a User Oriented Information System in a Mobile Computing Environment," Research Paper in Information Processing Society, IPSJ, Japan, May 15, 1998, vol. 98, No. 34, pp. 9-16. (with concise explanation of relevance in English).

* cited by examiner

ADVERTISING CAMPAIGN AND BUSINESS LISTING MANAGEMENT FOR A LOCATION-BASED SERVICES SYSTEM

This application is a continuation-in-part of U.S. application Ser. No. 09/946,111, filed Sep. 4, 2001, now U.S. Pat. No. 6,994,447, issued Sep. 13, 2005. This application claims the benefit of the filing date under 35 U.S.C. §119(e) of U.S. Provisional Application Ser. No. 60/286,916, filed Apr. 27, 2001. In addition, the following commonly owned patents and patent applications are related to this application: U.S. patent application Ser. No. 10/131,898, filed Apr. 25, 2002, entitled NATURAL LANGUAGE PROCESSING FOR A LOCATION-BASED SERVICES SYSTEM; U.S. Pat. No. 6,848,542 B2, issued Feb. 1, 2005, entitled METHOD FOR PASSIVE MINING OF USAGE INFORMATION IN A LOCATION-BASED SERVICES SYSTEM; U.S. patent application Ser. No. 10/133,118, filed Apr. 26, 2002, entitled ROUTING CALL FAILURES IN A LOCATION-BASED SERVICES SYSTEM; U.S. patent application Ser. No. 10/134,405, entitled TRACKING PURCHASES IN A LOCATION-BASED SERVICES SYSTEM; U.S. patent application Ser. No. 11/007,761, filed Dec. 8, 2004, entitled PASSIVE MINING OF USAGE INFORMATION IN A LOCATION-BASED SERVICES SYSTEM; and U.S. Pat. No. 6,944,447 B2, issued Sep. 13, 2005, entitled LOCATION-BASED SERVICES.

FIELD OF THE INVENTION

The present invention relates generally to providing information to communication devices and, more particularly, to providing a advertising campaign and business listing interface in a location-based services system that are targeted toward communication devices located in specific geographic areas.

BACKGROUND OF THE INVENTION

Wireless communication devices have recently evolved from a technology used by an elite segment of the population to a technology that is used by the masses. In the year 2000, it has been estimated that well over 100 million people in the United States alone subscribed to at least one type of wireless communication service. Worldwide, the number of wireless communication device users has reached a staggering number and is growing all of the time. In the near future, it is envisioned that almost everyone will own or use some sort of wireless communication device that is capable of performing a variety of functions.

In addition to traditional wireless communication devices, many different types of portable electronic devices are in use today. In particular, notebook computers, palm-top computers, and personal digital assistants (PDA) are commonplace. The use of wireless communication devices is widespread and it is expected that in the near future combined mobile telephone/PDA devices will be widely used by the masses. Currently, most of these devices are only used by a small segment of the population due, in large part, to the fact that there are a limited number of applications and services available for such devices.

The Internet has become a widely used medium for providing business information in a variety of forms that are targeted to various types of individuals and businesses. Generally speaking, one of the problems associated with searching for business information on specific products and services using the Internet is being able to locate relevant business information for products and services that are available in a geographic area that is located near the user. As such, a need exists for a way to provide a broad range of business information and content to wireless communication devices and workstations that are based on the respective geographic location of the communication device at the time the information is requested.

As more features become available to users of wireless communication devices different types of advertisers and businesses are going to have a desire to provide content to the users. In order to encourage advertisers and businesses to provide content, there needs to be a convenient system and method available to these individuals for inputting content, editing content and deleting content.

SUMMARY OF THE PRESENT INVENTION

A preferred embodiment of the present invention discloses a system and method for creating advertising content in a communication network. During operation, an advertising campaign parameter entry form is generated on a business remote terminal. Once generated, an advertiser enters advertising campaign parameters into the advertising campaign parameter entry form using the business remote terminal. After the advertising campaign parameters are entered, the advertising campaign parameters are transmitted to an advertiser portal. The advertiser portal then directs the advertising campaign parameters to a create campaign application. An advertising campaign is then created by the create campaign application that is based on the advertising parameters that are entered by the advertiser. The advertising campaign is then stored in a business database.

In the preferred embodiment, a campaign management interface application generates the advertising campaign parameter entry form and transmits it to a web browser on the business remote terminal. As such, the advertising data that is entered by the advertiser is preferentially transmitted to the advertiser portal using a mark-up language file. Another aspect of the present invention is limiting the advertising campaigns that are created to specific geographic regions that are located within a predetermined radius of consumers.

An edit campaign application is provided on the advertiser portal that allows the business remote terminal to edit the advertising campaign after being stored in the business database. A delete campaign application is also provided on the advertiser portal that allows the business remote terminal to delete the advertising campaign after being stored in the business database. In another preferred embodiment, the business remote terminal is a wireless communication device, which allows an advertiser to create, edit and delete advertising campaigns from virtually any location.

Another preferred embodiment of the present invention discloses a system and method for managing business listings in a communication network. In this embodiment, a business listing entry form is generated on a business remote terminal. A business entity then enters business listing data into the business listing entry form using the business remote terminal. Once the business listing data has been entered, it is transmitted to an advertiser portal where it is directed to a create business listing application. The create business listing application then creates a business listing that is based on the business data that is provided by the business user. Once the business listing is created, it is stored in a business profile database.

Preferentially, the business listing data is entered into the form using a web browser on the business remote terminal. The business listing data is also preferentially transmitted from the business remote terminal to the advertiser portal using a mark-up language file. During operation, the create business listing application extracts the business listing data and places it in a predetermined arrangement that is suitable for the location-based services system. The predetermined set of business listing data is preferentially selected from a group of parameters consisting of a business name, a business category, a product type, a service type, a business address, a business URL, a product name, a model name, a brand name, a price, an address and an operating hours indication and other data unique to individual business locations.

An edit business listing application is provided on the advertiser portal that allows the business remote terminal to edit the business listing after being stored in the business profile database. A delete business listing application is also provided on the advertiser portal that allows the business remote terminal to delete the business listing after being stored in the business profile database. In this embodiment, as with the other preferred embodiments of the present invention, the business remote terminal may be a wireless communication device or a desktop computing system.

Another preferred embodiment of the present invention discloses a system and method for editing advertising content in a communication network. In this embodiment, a predetermined advertising campaign that is associated with a respective advertiser is retrieved with a campaign management interface application located on an advertiser portal, wherein the advertising campaign includes a plurality of parameters. Once retrieved, the advertising campaign is transmitted to a business remote terminal, which generates a view of the advertising campaign. A user of the business remote terminal can then edit the parameters of the advertising campaign. After the advertiser is done editing, the advertising campaign is then transmitted back to an advertiser portal, which directs the advertising campaign to an edit campaign application. The edited advertising campaign is then stored in a business database using a data access component.

Yet another preferred embodiment of the present invention discloses a system and method for editing business listing content in a communication network. In this preferred embodiment, a predetermined business listing that is associated with a respective business is retrieved with a business profile interface application located on an advertiser portal, wherein said business listing includes a plurality of parameters. The business listing is then transmitted to a business remote terminal, which generates a view of the business listing. After the view of the business listing is generated, a user of the business remote terminal is allowed to edit the parameters of the business listing. Once the user is done editing the business listing it is transmitted back to the advertiser portal. The business listing is then directed to an edit business listing application and then stored in a business profile database using a data access component.

Further objects and advantages of the present invention will be apparent from the following description, reference being made to the accompanying drawings wherein preferred embodiments of the invention are clearly illustrated.

DETAILED DESCRIPTION OF THE PRESENTLY PREFERRED EMBODIMENTS OF THE INVENTION

Figure 1:
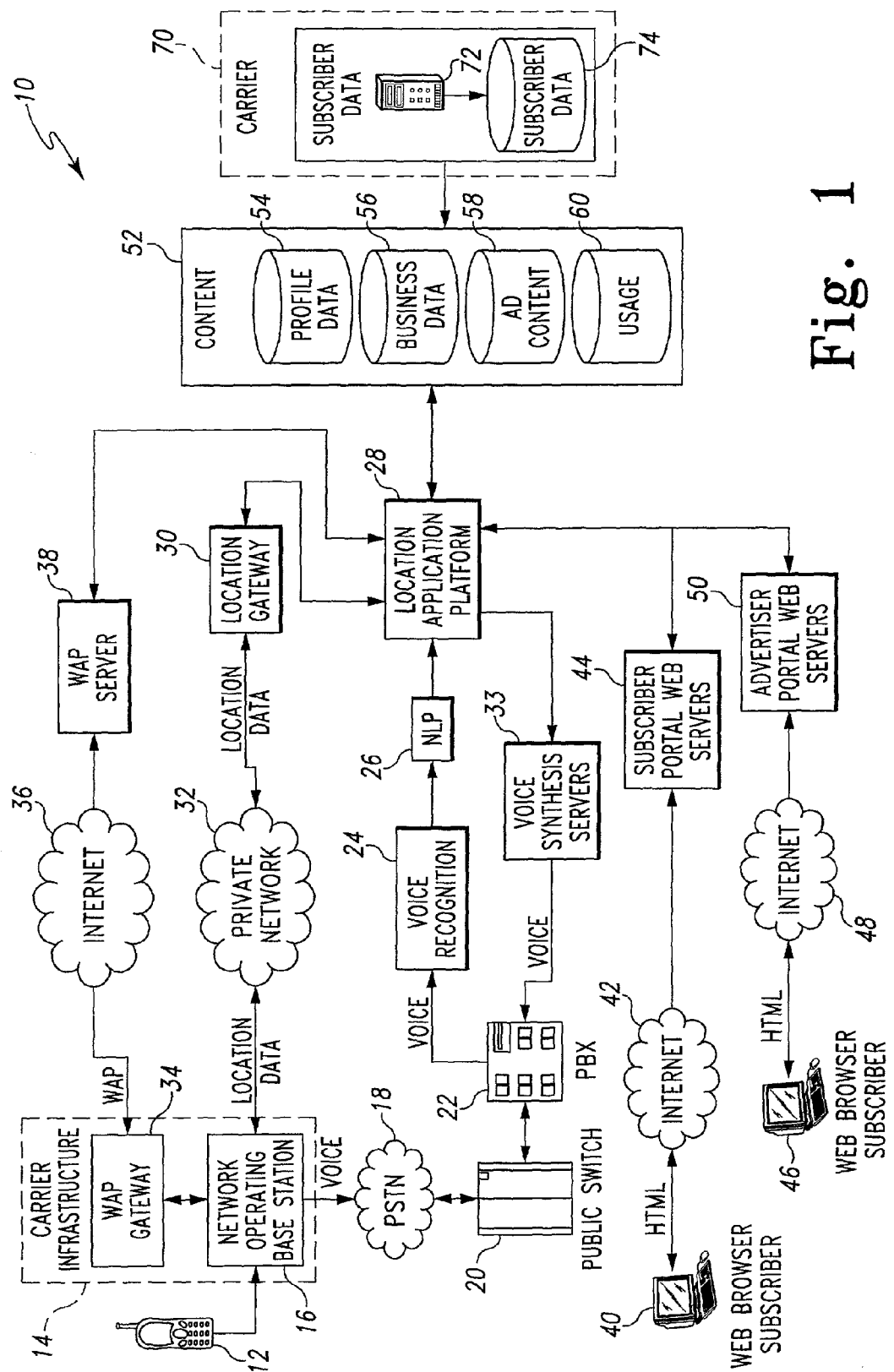
FIG. 1 illustrates a preferred embodiment of the location-based services system.

The present invention discloses a method and system for delivering location-based services through a variety of communication networks. Referring to FIG. 1, the preferred location-based services system 10 uses the geographic location of a remote terminal 12 to provide geographically targeted services to the remote terminal 12. Remote terminals 12 that subscribe to the location-based services system 10 are capable of selecting and receiving information from a broad range of business and service providers that are located in a geographic region that is close to the remote terminal 12 and, thus, the user.

As illustrated in FIG. 1, one preferred embodiment of the location-based services system 10 includes a remote terminal 12 that is connected to a wireless communication system 14 using one of several available and commonly used communication protocols. As illustrated, the remote terminal 12 is connected to a base station 16 of the wireless communication system 14, which transmits and receives radio signals to the remote terminal 12 during operation. Those skilled in the art would recognize that although only one base station 16 is illustrated in FIG. 1, several base stations 16 are actually used to make-up the preferred wireless communication system 14. Ideally, the preferred wireless communication system 14 would cover a wide geographic region, such as, by way of example only, the entire United States.

In the preferred embodiment of the present invention, the remote terminal 12 is capable of sending a digital input signal to the base station 16. The term digital input signal should be broadly construed to include voice signals, keypad input data, and pointer device selections or data from any other commonly used means for inputting data into a respective remote terminal 12. Those skilled in the art would recognize that several peripheral devices are available for various types of remote terminals 12 that could be used to input data into the remote terminals 12 and may be taken advantage of by the present invention.

Preferentially, the wireless communication system 14 is a digital communication system that uses one of several different methods of providing wireless digital communication between the remote terminals 12 and the base stations 16. The wireless communication system 14 can use frequency division duplexing (FDD) or time division duplexing (TDD) to allocate for the two directions of transmission between the remote terminal 12 and the base station 16.

In order to provide multiple access methods to the remote terminals 12, which refer to the method of creating multiple channels for each transmission direction, one of several different types of multiple access methods may be used in the present invention. Three preferred types of multiple access methods that might be used include: frequency division multiple access (FDMA); time division multiple access (TDMA); and/or code division multiple access (CDMA). Those skilled in the art would recognize that the present invention could readily be adapted to take advantage of other multiple access methods as well.

As further illustrated in FIG. 1, in the preferred embodiment of the present invention the base station 16 of the wireless communication system 14 is connected to a public switched telephone network (PSTN) 18 by a public switch 20.

As known to those skilled in the art, the PSTN 18 is a worldwide voice telephone network that is used to allow various communication devices to communicate with each other. Although the preferred PSTN 18 is a digital system, the present invention may be adapted for use on analog systems as well to accommodate geographic regions that might be underdeveloped or not serviced by a digital system.

The public switch 20 transfers the signals that are received from the base station 16 to a private branch exchange (PBX) 22. The public switch 20 is connected to the private branch exchange (PBX) 22, which, as generally known in the art, is a telephone switching system that is used to interconnect various telephone extensions to each other. In the preferred embodiment of the present invention, the PBX 22 uses all-digital methods for switching and is capable of supporting digital remote terminals and telephones and analog remote terminals and telephones. As set forth in greater detail below, in the preferred embodiment, the PBX 22 is connected to a server of the location-based services system 10, which is a form of a digital remote terminal.

Referring to FIG. 1, in this embodiment of the present invention, the PBX 22 is connected to at least one voice recognition server 24. The voice recognition server 24 contains at least one voice recognition application that is operable to recognize the respective words that are contained in the voice signals that are received from the PBX 22. As set forth in greater detail below, a resulting output is generated by the voice recognition application that is used by a natural language processing application.

The voice recognition server 24 is connected to at least one natural language processing server 26 that includes at least one natural language processing application that processes the identified words contained in the voice signals to ascertain the meaning of the words that are contained in the voice signals. As such, during operation, the voice recognition server 24 identifies or recognizes the particular words that are contained in the voice signals and the natural language processing server 26 interprets the meaning of the recognized words of the voice signals that are originally generated from the remote terminal 12. The natural language processing application may be located on the voice recognition server 24 in other embodiments of the present invention, but, in an effort to increase the level of performance, would preferentially be located on a separate server or a separate set of servers.

The natural language processing server 26 is connected to at least one location-based application server 28. As set forth in detail below, the location-based application server 28 is programmed to provide responsive information to the remote terminals 12 that has been requested by a respective user of the remote terminal 12. Generally speaking, the location-based application server 28 is used to retrieve and pass on location-based information to the remote terminals 12 in various data formats. The type of information provided to the remote terminals 12 varies depending on the specific nature of the information that has been requested from the user and the geographic location of the remote terminal 12.

During operation, after the meaning of the words in the voice signals are interpreted, the natural language processing server 26 is programmed to create a structured request that is sent to the location-based application server 28. In response to the structured request, the location-based application server 28 generates a structured response that is sent to the remote terminal 12. As set forth in greater detail below, the exact nature of the information sent in the structured response depends on the specific request that is made by a particular user of the remote terminal 12.

If an analog voice signal is used, although not illustrated in FIG. 1, at least one digital signal processor server could be used to convert the analog signal into a digital signal that the voice recognition server 24 can process and interpret using the voice recognition applications. In this respective embodiment, the digital signal processor server is preferentially connected between the voice recognition server 24 and the PBX 22. Those skilled in the art would recognize that the voice recognition server 24 might also be designed to perform the functions of the digital signal processor server in other embodiments of the present invention.

Each remote terminal 12 also sends a unique remote terminal identifier to the base station 16 while communicating with the base station 16 of the wireless communication system 14. The remote terminal identifier is preferentially attached to each voice signal as it passes through the location-based services system 10 so that the system can keep track of which respective remote terminal 12 is supposed to receive the information that has been requested. Those skilled in the art would recognize that various identification methods might be used to keep track of specific remote terminals 12 using the location-based services system 10.

As further illustrated in FIG. 1, the location-based application server 28 is also connected to a location gateway server 30, which is, in turn, connected to the base station 16 of the wireless communication system 14. The location gateway server 30 is used by the location-based application server 28 to retrieve a geographic indicator that is associated with each respective remote terminal 12. As such, while a respective remote terminal 12 is connected to the wireless communication system 14, the location-based application server 28 is capable of determining the respective geographic location of the remote terminal 12 so that geographically targeted responses and information can be provided to the remote terminal 12.

As illustrated in FIG. 1, the location gateway server 30 is preferentially connected to the base station 16 of the wireless communication system 14 using a network connection 32, which may be a private network connection or an Internet connection in alternative embodiments of the present invention. The geographic indicator may be generated by the remote terminal 12 or the base station 16 and is preferentially transmitted to the location-based application server 28 when a user of the remote terminal 12 is accessing the location-based services system 10. The geographic indicator is preferentially transmitted to the location-based application server 28 with the remote terminal identifier so that the location-based application server 28 can associate each respective remote terminal 12 with a particular geographic location.

In the preferred embodiment of the present invention, the geographic indicator may be preset by a user of the remote terminal 12, automatically generated by a GPS located in the remote terminal 12 or generated by a specialized geographic determination application running on the base station 16. In addition, the present invention may advantageously take advantage of an enhanced 911 system of the wireless communication system 14 to generate the geographic indicator. In another embodiment of this invention, the geographic indicator may originate from a combination of these sources and/or systems (i.e. it could come from a GPS-assisted network that uses GPS and devices on the network). The geographic indicator may automatically be sent to the location-based application server 28 as soon as a respective remote terminal 12 connects to the wireless communication system 14; however, in alternative embodiments of the present invention, the geographic indicator is only sent when a respective remote terminal is sending a structured request to the location-based application server 28. As the geographic location of the remote terminal 12 changes, the geographic indicator is updated and the updated information can continuously be sent to the location-based application server 28.

As further illustrated in FIG. 1, at least one voice synthesis server 33 is connected to the location-based application server 28 and the PBX 22. For voice-related applications of the location-based services system 10, the voice synthesis server 33 is used to generate voice responses that are based on the structured responses that are generated in response to the structure requests that are received by the location-based application server 28. Voice synthesis applications on the voice synthesis server 33 are used to transform the structured responses into voice response. In the preferred embodiment, the PBX 22 is used to transmit the voice responses to the PSTN 18, which, in turn, transmits the voice response to the base station 16, which ultimately transmits the voice response on to the remote terminal 12. In alternative embodiments of the present invention, the voice synthesis server 33 may be connected directly to respective base stations 16 of the wireless communication system 14.

Referring once again to FIG. 1, in yet another preferred embodiment of the present invention, the remote terminal 12 is connected to the location-based application server 28 through a wireless application protocol (WAP) gateway 34 of the wireless communication system 14. The WAP gateway 34 is connected to a WAP server 38 of the location-based services system 10 through a network connection 36. The network connection 36 may be a private network connection or an Internet connection. The WAP server 38 is connected to the location-based application server 28 and, during operation, is used to generate structured requests, which are based on requests that are input to the remote terminal 12 and sent to the location-based application server 28.

The remote terminal 12 is capable of communicating with the WAP server 38 and the location-based application server 28 using a WAP standard. As known to those skilled in the art, the WAP standard is a protocol that is designed for wireless communication devices to provide secure access to e-mail and text-based web pages. WAP provides a complete environment for wireless applications that includes a wireless counterpart of TCP/IP and a framework for telephony integration. In the preferred embodiment of the location-based services system 10, the remote terminals 12 may also be capable of browsing for location-based services through the use of text and graphical based menus that can be provided to the remote terminals 12 from the location-based application server 28.

One preferred embodiment of the present invention uses the WAP standard to support the use of a Wireless Markup Language (WML), which is a streamlined version of HTML for small screen displays, to conduct communication and transfer information between the remote terminal 12 and the location-based application server 28. WAP is also capable of using WMLScript, which is a compact JavaScript-like language that is capable of running in limited memory on the remote terminal 12. The location-based services system 10 can also be designed to advantageously take advantage of this capability to provide location-based services to users of remote terminals 12 depending the particular geographic location of the remote terminal 12.

In this preferred embodiment of the present invention, the WAP standard supports various handheld input methods such as keypad inputs or pointer device inputs that may be generated on various different types of remote terminals 12. As it relates to the present invention, this gives users of the remote terminals 12 the capability of inputting data from keypads for the purposes of entering search requests to the location-based services system 10. In addition, the remote terminals 12 are capable of receiving, interpreting and displaying web pages that include hypertext links to other web pages that may be selected using various selection methods.

For the purpose of the present invention, the term wireless application protocol should be broadly construed to include any communication protocol similar to what is commonly referred to as the "WAP standard," which, as set forth above, is used to transmit text and graphics-based information to remote terminals 12. Although the WAP standard is used in this particular preferred embodiment of the present invention, those skilled in the art should recognize that other text and graphics-based communication protocols could be used in alternative embodiments of the present invention.

For example, although not specifically illustrated, another preferred embodiment of the present invention could be designed for an i-Mode wireless communication system. i-Mode wireless communication systems use a packet-based communication protocol to communicate between the remote terminals 12 and the base station 16, which essentially means that the remote terminals 12 are connected to the wireless communication system at all times and communicate with the base stations 16 using packets. i-Mode is also capable of providing web-browsing and customized applications to remote terminals 12.

i-Mode is a proprietary system that uses a subset of HTML, known as cHTML, in contrast to the WAP standard, which uses WML. In this particular embodiment, an i-Mode server is used to connect the base station 16 of the wireless communication system 14 to the location-based application server 28. The remaining details of this particular embodiment are similar to other embodiments of the present invention and, as such, a more detailed discussion is not necessary.

Referring to FIG. 1, in yet another preferred embodiment of the location-based services system 10, a second remote terminal 40 is connected to a subscriber portal web server 44 through a network connection 42. The network connection 42 may be a private network connection or an Internet connection. As illustrated, the subscriber portal web server 44 is also connected to the location-based application server 28. During operation, the second remote terminal 40 is programmed to receive structured requests that are sent to the location-based application server 28 and, likewise, the location-based application server 28 is programmed to generate structured responses that are sent to the second remote terminal 40.

The second remote terminal 40 and the location-based application server 28 preferentially communicate with each other using standard web-based protocols that are commonly used in various Internet-based applications. In this embodiment of the present invention, a user accesses the subscriber portal web server 44 through the second remote terminal 40, which is preferentially a computer workstation. As a subscriber to the location-based services system 10, the second remote terminal 40 is assigned a predetermined geographic indicator. The geographic indicator is used by the location-based application server 28 to target services and business content to the second remote terminal 40 that are based on the geographic location of the second remote terminal 40.

The user of the second remote terminal 40 may be given the option of setting the geographic indicator to a desired geographic location, which may or may not be the exact geographic location of the second remote terminal 40. For example, if the user is traveling to another city that evening and wants to access location-based services in that particular city, an option can be provided allowing the second remote terminal 40 to designate that particular city.

In this preferred embodiment of the present invention, the second remote terminal 40 is preferentially a computer workstation that includes multimedia capabilities and includes a microphone and a sound card. As known to those skilled in the art, this allows the second remote terminal 40 to generate sound through a speaker system and receive voice signals through the microphone. Although not specifically illustrated in FIG. 1, this could allow the subscriber portal web server 44 to be connected to the voice recognition server 24 so that voice signals sent from the second remote terminal 40 could be processed similar to the method used to process voice signals received from wireless remote terminal 12.

Referring to FIG. 1, a business remote terminal 46 is connected to a network connection 48 that is connected to an advertiser portal web server 50. The network connection 48 may be a private network connection or an Internet connection. The advertiser portal web server 50 allows various businesses (i.e., content providers) to add, modify and/or delete campaigns that are designed to promote and sell various products and services through the location-based services system 10. For example, if a particular business entity desires to run a promotion on a particular product or service, the advertiser portal web server 50 allows the business entity to modify their respective listings to include the respective items or services on special.

As further illustrated in FIG. 1, the preferred location-based services system 10 is also capable of leveraging data that is preferentially grouped in four logical data groupings 52. These logical data groupings include profile data files 54, business data files 56, additional data files 58 and usage data files 60. The data files 54-60 contain detailed information on various items and services that are used by the location-based services system 10, which is set forth in detail below. The data files 54-60 can be located on the location-based application server 28, but are preferentially maintained on separate servers.

The profile data files 54 contain a group of logical entities that contain relevant information concerning each consumer of the location-based services system 10. These logical entities include, but are not specifically limited to the following items: consumer name; consumer phone number; consumer identification; consumer password; consumer home address; consumer home phone number; consumer email address; consumer pager number; consumer service subscriptions (detailing the consumers chosen level of participation in one or more services); consumer privacy preferences (detailing information denoting the willingness to share a consumers private data with others based on data type, requester, service, etc.); consumer service preferences (detailing any specific saved information that is relevant to any of the services which a consumer may use, such as: named locations (such as the address for a consumers work location, or the address(es) of a consumers friend(s); named interests or preferences regarding hobbies, news topic interest, sports, music, preferred brands or chains, banking information and other demographic information. (such as NBA basketball, Jazz music, Italian food, favorite clothing brands or chains, banking information, etc.)); and preferred asynchronous communication method (such as email or pager) listed by service and/or service/content provider.

The business data files 56 are composed of a group of logical entities containing all relevant information regarding the businesses listed within the location-based services system 10, including but not limited to: business name; business phone number; business text description; business audio description; business video description; business and/or product images; business identification; business password; business category or categories; advertising participation level; advertising campaign information such as: parameters that define target market; campaign identification code; advertising content and special deals/discounts; saved data mining/reporting parameters; brands sold; brands serviced; product types sold; product types serviced; product models sold; product models serviced; product model prices; and service prices and inventory list (by brand, product type and product model).

The additional data files 58 contains a group of logical entities that generally includes any additional content that is capable of being leveraged by the location-based services system 10, possibly including, but not limited to: business ratings (via external evaluation services); weather conditions; driving directions; maps; traffic Although not specifically illustrated, the residential telephone number and address listings may be provided by local telephone companies through a residential listing server that is connected to the location-based application server 28.

The usage data files 60 contains a group of logical entities that generally includes all recorded information regarding consumer transactions from remote terminals 12, 40, possibly including, but not limited to: consumer identification (or a unique hash of consumer identification); date; time; service used; request type; search criteria; matched data purchases made, and actions taken. Those skilled in the art would recognize that several other types of usage data might be stored in the usage data files 60.

As generally set forth above, users of the location-based services system 10 are given the ability to search, via a remote terminal 12, 40, for a business that will satisfy specific purchase or service requirements using multiple access methods (voice, wireless application protocol or web application protocol). The location-based application server 28 is programmed to handle a variety of structured requests and is capable of generating a variety of structured responses in the same format (i.e.—voice, wireless application protocol or web application protocol) that the structured request was received by the location-based application server 28.

Some of the structured request parameters that are capable of being used for the business services provided by the location-based services system 10 include (but are not necessarily limited to) one or more of the following: product type; service type; business name; business category; product name (or model name); product brand; price level; business or service ratings (i.e. external evaluation from a rating service such as AAA); whether special deals are provided; location (auto-location (locating nearest ATM for instance), predefined locations, or consumer-specified locations); hours of operation; availability of service (for example: availability of a open table at a specified time at a restaurant); and company specified within favorites for a category (i.e., name of favorite coffee house franchise). Those skilled in the art would recognize that a variety of structured request parameters might be used in the present invention.

Optionally, consumers have the ability to "opt-in" to "push" content and advertising services. Push services are defined as services, which proactively deliver content to the consumer through the remote terminal 12, 40, rather than services delivered only following a request by the consumer. As set forth above, the preferences of the consumers that use the remote terminals 12 are stored within the profile data files 54. As such, by way of example only, a consumer that likes golf may be "pushed" an offering as they travel close to a nearby golf equipment store relating to a special offer on an item such as a golf club or particular brand of golf ball.

As set forth briefly above, the location-based services system 10 also gives businesses the ability to manage their respective content and mine usage data by using the advertiser portal web server 50. The advertiser portal web server 50 preferentially includes the following web-based applications: a campaign management application, a business profile management application, a mining/reporting and predictive modeling application. Each of these applications and their respective functional aspects is discussed in greater detail below.

The campaign management application includes several applications that allow a business to create advertising campaigns and an edit/delete advertising campaigns. The create campaign capability enables an advertiser to create a location-based advertising campaign. As part of this capability, the business would define the market segment at which the advertising is targeted. Then, the advertiser would define the advertising content that would be delivered to the target market, as well as the mechanism of delivery (i.e. pushed to each consumers remote terminal 12, 40, or presented only to a consumer when they make a relevant enhanced directory assistance request/search). The edit/delete campaign capability allows the business to modify or delete an existing campaign that has already been created and is running on the location-based application server 28.

The business profile management application includes a create business listing capability and an edit business listing capability. The create business listing capability enables a business to define their respective set of business data (see above for a list of content within the business data). The edit business listing capability allows the business to modify or delete their business listing. Those skilled in the art would recognize that several other options might be made available through the business profile management application.

The mining/reporting capability allows business to interface with data that is stored in the usage data files 60. An advertising effectiveness interface utilizes the usage data files 60 and business data files 56 to generate analysis surrounding the effectiveness of location-based advertising campaigns. The analysis will address questions such as "How many people received my campaign in the downtown area of Atlanta". The information provided to the businesses provides them insight to quantify the results of campaigns created in the location-based services system 10 through the campaign management tool.

The predictive modeling capability provides forecasting for potential customers likely to respond to offers, listings and deals. Examples of the type of feedback the consumer will receive include (but not limited to) the following: identifying customers likely to respond to their campaign by customer segment; identifying customers likely to request a campaign or listing by customer segment; and identifying demands by peak time or day.

As briefly set forth above, the location-based services system 10 provides a consumer using a remote terminal 12, 40 with access to products and services in a designated geographic area through multiple access methods such as voice, wireless application protocols (such as WAP and cHTML) and web protocols (such as Java and HTML). The present invention encompasses the full lifecycle of the location-based services system 10 including delivery and maintenance, which includes content management, consumer management, content delivery, advertising management, advertising reporting, advertising delivery, usage tracking, usage mining and reporting, billing and settlements.

The preferred location-based services system 10 is capable of providing location-based services to consumers through remote terminals 12, 40 and is managed by various content providers through the use of respective business remote terminals 46. The services that are provided through the location-based services system 10 preferentially includes an enhanced directory assistance service and an enhanced business service that is delivered through a voice recognition capability, wireless application protocol capability and/or web application capability.

In order to access the enhanced directory assistance services or the business services, the user of the remote terminal 12 preferentially enters a predetermined key sequence (e.g.— by pressing 411) on the keypad of the remote terminal 12 or by pressing a specially designed key on the remote terminal 12. If the remote terminal is not connected to the base station 16 already, when the enhanced directory assistance services or business services are selected, the remote terminal 12 establishes a connection with the base station 16 of the wireless communication system 14, which acts as a gateway to the location-based services system 10.

In another embodiment, in order to select one of the respective services, the user of the remote terminal 12 is given the option of using voice commands, but as previously set forth may also use keypad inputs on the remote terminal 12 to select the desired services as well. Those skilled in the art should recognize that the enhanced directory assistance services and the business services do not necessarily have to be provided through the same access method and that a keypad-based menu system may be used until the appropriate time occurs for the user to input a voice signal containing a request for information.

By way of example only, if the enhanced directory assistance services are selected by a user of the remote terminal 12, either the base station 16, the location-based application server 28 or remote terminal 12 can be programmed to generate a search parameter request that is audibly generated on the remote terminal 12. In the embodiment being discussed, the search parameter request is sent in the form of a voice signal that prompts the user to state the first and last name of the person they are looking for. In addition, the search parameter request could also include an option that might prompt to user to also state the geographic area where the person is located. As should be apparent from the discussion above, since the location-based services system 10 includes voice recognition applications, those skilled in the art should recognize that the entire process of entering the search parameter request may be done by voice signals generated on the remote terminals 12.

In response to the search parameter request that is generated on the remote terminal 12, the user preferentially provides a vocal response to the remote terminal that is transmitted to the base station 16. The vocal response preferentially includes a first name response and a last name response (and possibly a detailed geographic information response for non-local listings) of the particular person the user is looking to retrieve information on. The vocal response to the search parameter request, which preferentially also includes a unique remote terminal identifier that is associated with each respective remote terminal 12, is then sent from the remote terminal 12 to the base station 16. The base station 16 transmits the voice response to the PSTN 18, which then routes the vocal response, together with the remote terminal identifier, to the PBX 22.

The PBX 22 transmits the vocal response and the remote terminal identifier as inputs to voice recognition applications and natural language processing applications that are located on servers 24, 26, which in turn, respectively transform the vocal response and the remote terminal identifier into a structured residential listing request that is sent to the location-based application server 28. As set forth in detail above, the voice recognition applications analyze the vocal responses for the purposes of making a determination of the identity of particular words contained in the vocal responses. Any detailed geographic information provided by the user is also added to the structured residential listing request that is sent to the location-based application server 28.

Figure 2:
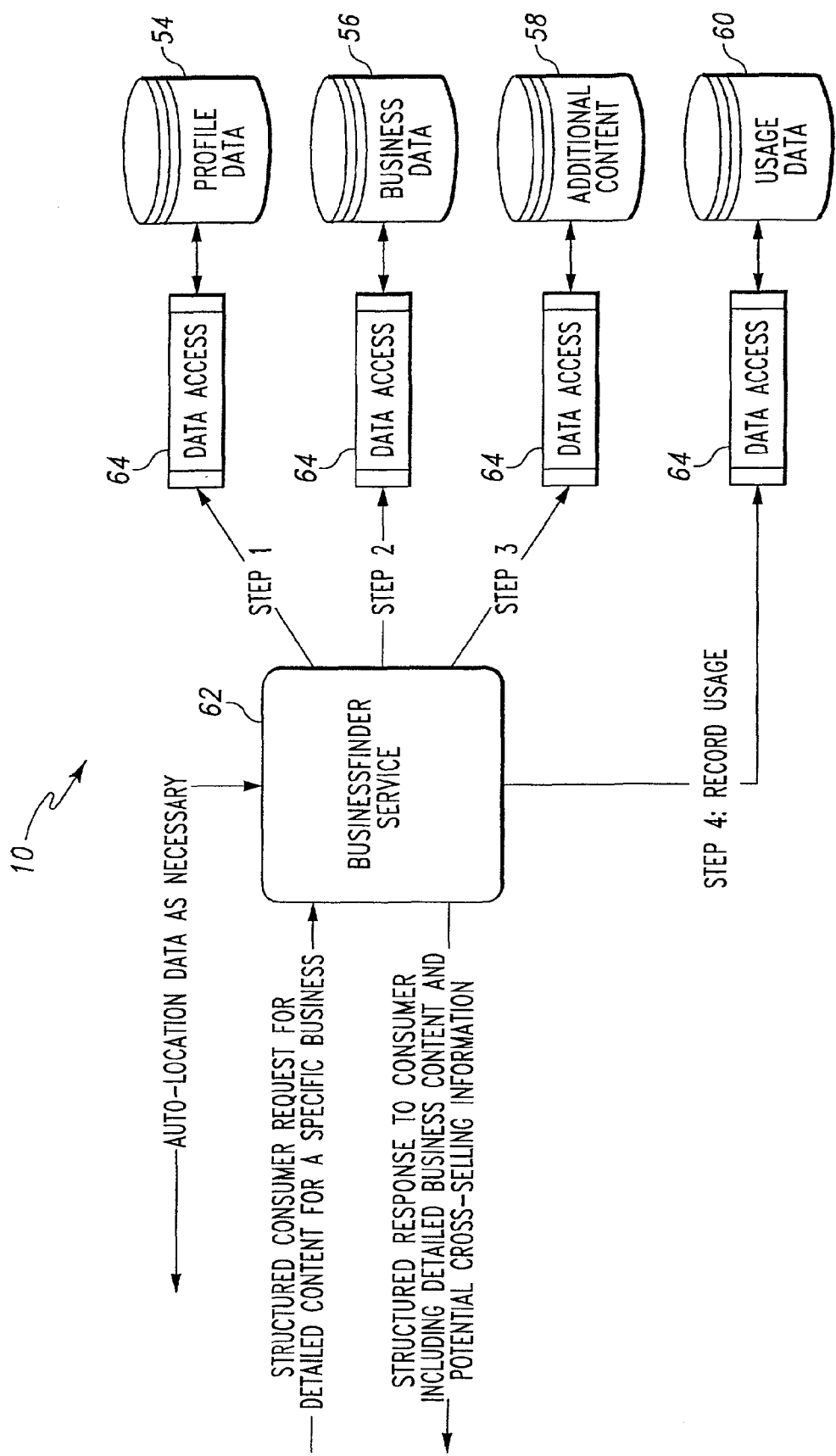
FIG. 2 is a flow chart illustrating the process steps performed by the location-based application server when processing structured requests.

As illustrated in FIG. 2, the structured residential listing request is used as an input to a residential finder application 62 located on the location-based application server 28. During operation, the residential finder application 62 interprets the structured residential listing request and uses at least one data access routine 64 to locate and retrieve the specific information requested by the structure residential listing request from a respective database file 54-58. Those skilled in the art should recognize that several database servers may be connected to the location-based application server 28 that are used to store various forms of information and content that is provided to users by the location-based services system 10 in varying types of formats, which will be set forth in greater detail below.

In the preferred embodiment of the present invention, the residential finder application 62 matches up the structured residential listing request with the geographic indicator of the remote terminal 12. If no geographic information is contained in the structured response, the residential finder application 62 conducts a search of the profile data files 54 and the additional data files 58 with data access routines 64 targeted within a predetermined area based on the geographic location of remote terminal 12. If geographic information is included in the vocal response, the residential finder application 62 conducts a search within the geographic area specified by the user. As set forth above, in the preferred embodiment of the present invention the residential listing database files are stored under the additional data files 58 by way of example only and should not be construed as a limitation of the present invention.

The residential finder application 62 preferentially also searches the profile data files 54 so that if the identity of the person contained in the structured residential request is identified as a subscriber of the location-based services system 10, a remote terminal 12 telephone number and/or an email address may also be added to the response that is provided to the user requesting the desired information. If the located person does turn out to be a subscriber of the location-based services system 10, other embodiments of the present invention allow the subscriber to create a personalized response that is stored in a database file and is provided in response to residential listing requests that identify them.

In addition to receiving the structured residential listing requests, the residential finder application 62 obtains a geographic indicator and a remote terminal identifier associated with the remote terminal 12. This allows the system to default to the geographic location of the remote terminal 12 to conduct the search, as set forth above. For instance, if the remote terminal 12 is located in Atlanta, Ga., the residential finder application 62 will know this from the geographic indicator and will only search listings in the Atlanta area.

Once the appropriate data is located by the residential finder application 62 that is responsive to the structured residential listing request, which in the present example would preferentially include at least one telephone number and/or the address of the person(s) named in the voice signal, the residential finder application 62 is operable to generate a structured residential response that is sent to voice synthesis server 33. As set forth in detail above, the voice synthesis server 33 is programmed to transform the structured residential response into a voice response signal with voice synthesis applications located on the voice synthesis server 33.

As set forth briefly above, the voice response that are generated by the voice synthesis server 33 can include the name, address, residential telephone number, mobile number and/or email address of the particular person for which the user has requested a residential listing. For those instances where the structured residential responses include more than one residential listing, the residential listing finder application 62 is preferentially programmed to generate a structured residential response that provides the multiple listing results in a predetermined organized listing arrangement.

The predetermined organized listing arrangement is preferentially set up so that the user of the remote terminal 12 is capable of interacting with the listings provided in the voice response through the use of a keypad input or by voice signals that are spoken into the remote terminal 12 by the user. Preferentially, the information is organized and presented to the user of the remote terminal 12 based on the address of the particular people identified by the residential finder application 62, however, those skilled in the art would recognize that other alternatives of presenting and organizing the results exist (i.e.—ranking the results in geographic order) are capable of being used in varying embodiments of the present invention.

If the person for whom information has been requested is designated as being unlisted or unavailable, the location-based application server 28 is preferentially programmed to generate a structured residential response that contains a message that indicates that the requested information is unlisted or unavailable. As such, in this particular embodiment of the present invention the location-based application server 28 sends the structured residential response to the voice synthesis server 33, which generates a voice signal that is sent to the remote terminal 12 informing the user that requested the residential listing that the requested residential listing it unlisted or unavailable.

As briefly set forth above, another preferred embodiment of the location-based services system 10 is capable of providing business services to the remote terminal 12, which are provided to the remote terminal 12 based on the geographic location of the remote terminal 12. If the user of the remote terminal 12 selects the business services option instead of the enhanced directory assistance services option, a variety of information services are capable of being delivered to the user through the location-based services system 10. During operation, the business services are provided to the remote terminal 12 through similar access methods that the residential listing services are provided to the remote terminal 12. In addition to being able to obtain the address and telephone number of local businesses, various other forms of business information is capable of being transmitted to the remote terminal 12 by the location-based services system 10.

As generally set forth above and in greater detail below, some of the preferred structured business request parameters that are capable of being processed by the business services of the location-based services system 10 include (but are not necessarily limited to) one or more of the following parameters: product/service types; business names; business category; product name (or model name); product brands; price level; business or service ratings (e.g.—external evaluation from a rating service such as AAA); whether special deals or offers are being provided; auto-location of predefined services (e.g.—locating the nearest ATM for instance); hours of operation; availability of service (e.g.—availability of a open table at a specified time at a restaurant); and/or business information specified within a user defined favorites category (e.g.—name of favorite coffee house franchise, favorite clothing brands, favorite restaurants).

In this preferred embodiment of the present invention, once a user of the remote terminal 12 gains access to the business services provided by the location-based services system 10, they are prompted by a voice signal requesting the user to state their respective business request. In response to the prompt for a business request, the user states a vocal response that is received by the remote terminal 12 that contains a predetermined request for a predetermined type of business content. The exact nature and content of the vocal response will vary, depending on the specific type of business/service information that is being requested by the user of the remote terminal 12. As set forth above and below, the preferred embodiment of the present invention includes natural language processing applications the are used to interpret the meaning and context of the words contained in the vocal response, thereby allowing the user of the remote terminal 12 to make a request using requests that are spoken using statements commonly used in everyday conversations.

By way of example only, lets say that a respective user of the remote terminal 12 wants to obtain business information related to determining the location of a favorite local fast-food restaurant. As such, the user's vocal response that is received by the remote terminal 12 might contain a voice signal that includes a request for business information that could be phrased something along the lines of the following statement: "What is the address of a Burger King restaurant that is close to my present location?" As previously set forth, this preferred embodiment of the present invention is capable of interpreting this request using natural language processing applications to generate a structured response.

As with the residential services, in this embodiment of the present invention the vocal response that is provided by the user of the remote terminal 12 is transmitted from the remote terminal 12 to the base station 16 of the wireless communication system 14, which in turn is operable to transmit the vocal response to the PSTN 18 that transmits the vocal response to the PBX 22. The vocal response is then sent from the PBX 22 to the voice recognition server 24 where it is processed with voice recognition applications to determine the identity or recognize the respective words that are contained in the vocal response from the user containing a business information request. Although not illustrated, in an alternative embodiment of the present invention the base station 16 is directly connected to the voice recognition server 24, thereby allowing the base station 16 to directly transmit vocal response to the voice recognition server 24.

After the words contained in the vocal response have been recognized using voice recognition applications, a respective output is generated by the voice recognition applications, which is used as an input to natural language processing applications. As set forth in detail above, the natural language processing applications determine the meaning and context of the words contained in the vocal response that is received by the remote terminal 12. Referring once again to FIG. 2, once the meaning and context of the recognized words contained in the vocal response have been determined, the natural language application is programmed to generate a structured business request that is sent to the location-based application server 28. The location-based application server 28 includes at least one business/services finder application 62 that is operable to process the structured business request by retrieving the requested information.

As set forth in detail above, the remote terminal 12 also sends a remote terminal identifier with the vocal response that is preferentially integrated in some manner with the structured business request that is ultimately generated and sent to the location-based application server 28. In addition, in this preferred embodiment of the present invention as well as others, a geographic indicator and a remote terminal identifier associated with the respective remote terminal 12 making the structured business request is also obtained or has already been obtained by the location-based application server 28. As illustrated in FIG. 2, the geographic indicator and the structured business request are used by the business/services finder application 62 to generate a structured business response that is responsive to the structured business request.

In our current example, the preferred business/services finder application 62 uses the geographic indicator of the remote terminal 12 to determine which particular Burger King location is closest to remote terminal 12. A mapping routine within the business/services finder application 62 compares the geographic location of the remote terminal 12 with the respective geographic locations of Burger King restaurants retrieved by the structured business request and makes the determination of which location is closest to the remote terminal 12, which can be based on the distance of the remote terminal 12 from each respective location. As illustrated in FIG. 2, this is accomplished by a data access routine 64 that accesses the appropriate information from the business data files 56, which preferentially contains a database of business listings, addresses, products and/or services provided.

After the appropriate information is located, the location-based application server 28 is programmed to generate a structured business response that is sent to the voice synthesis server 33. The voice synthesis server 33 converts the structured business response into a voice signal that is then sent to remote terminal 12. In this example, the structured business response would contain the address of the Burger King that is closest to remote terminal 12, which has been determined by the location-based application server 28 based on the geographic location of remote terminal 12.

In yet another example of this embodiment of the present invention, a user of the business services might request information on a retail store that sells a specific product or provides a specific service. For instance, a user might state: "Who sells or provides product/service (stating the particular product/service desired)?" After the voice recognition application and the natural language processing application interpret and transform the request into a structured business request, the business/services finder application 62 uses the geographic indicator of remote terminal 12 to narrow the structured business request to retrieve business information contained within a predefined geographic area in which the remote terminal 12 is located. If more than one business sells the item or provides the requested service, the business/services finder application 62 is programmed to generate a structured business response that is sent to voice synthesis server 33 containing a listing of the respective businesses meeting the desired criteria.

In yet another preferred embodiment of the present invention, the user is able to access the location-based services system 10 by using a wireless application protocol to generate and transmit structured requests to the location-based application server 28. A user of remote terminal 12 uses a keypad or some other equivalent input means to access the location-based services system 10 from a selection menu that is generated on a display of remote terminal 12. In this preferred embodiment of the present invention, once a user chooses to obtain access to the location-based services system 10, the remote terminal 12 is preferentially programmed to display a selection menu that contains a link to the business services and residential listing services provided by the location-based services system 10. Those skilled in the art would recognize that various predefined links and menu selections for various types of services may also be displayed that may or may not be specified by the user of remote terminal 12.

If the residential listing service is selected on the remote terminal 12, the user is prompted by remote terminal 12 to enter the first and last name of the person for which they desire to obtain information. By default, the remote terminal 12 is preferentially programmed to search for a listing that is contained in the immediate geographic location of the remote terminal 12. For example, if remote terminal 12 is located in the Atlanta metropolitan area, the search will be preset to be conducted using the Atlanta residential listings database. In alternative embodiments of the present invention, an additional input area is provided on the display of the remote terminal 12 whereby the user may designate the particular geographic location to search (i.e.—a city and state input location). As apparent, this allows the user to vary the location searched based on user preferences thereby providing further benefits to the user.

An additional item the remote terminal 12 is programmed to generate on the display is an icon or a selection area that is designated to cause the remote terminal 12 to transmit the search request, which contain the parameters that have been input by the user, to the base station 16 of the wireless communication system 14. As previously set forth, preferentially the search request is sent to the base station 16 using a wireless application protocol, which for the purpose of the present invention should be broadly construed to include a broad range of standards used by various wireless communication systems 14. The remote terminal 12 also transmits a remote terminal identifier with the search request, which as previously set forth, is assigned to remote terminals 12 for identification purposes. Once received by the base station 16, the search request is directed to the WAP gateway 34, which in turn, is preferentially programmed to transmit all search requests that are received by users accessing the location-based services system 10 to the WAP server 38.

The WAP server 38 is programmed to interpret the search request and generate a structured residential request that is sent to the location-based application server 28. For identification purposes, the remote terminal identifier is also transmitted to the location-based application server 28 with the structured residential request. As with other embodiments of the present invention, the location-based application server 28 is programmed with a residential finder application 62 that uses one of several data access routines 64 to obtain the requested information from a respective database file 54-58. A structured response is then sent to the WAP server 38, which in turn transmits the structured response to the WAP gateway 34 and ultimately on to the remote terminal 12.

If the business services option is selected, the remote terminal 12 prompts the user for a search request, which the user enters on the remote terminal 12. The search request is then sent to the location-based application server 28, in a similar fashion as described with the directory assistance services, where it is processed by a business/services finder application 62. The business/services finder application 62 uses data access routines 64 to retrieve the desired information and generates a structured response that is based on the geographic location of the remote terminal 12.

For example, if the remote terminal 12 is located on the upper north side of Atlanta, Ga., the location-based application server 28 will be informed of this fact by receiving a geographic indicator from the second remote terminal 12 and will be operable to generate structured responses to structured requests that contain information that is targeted for that particular geographic location. For instance, if a user of the remote terminal 12 enters a search request for information on "Chinese restaurants running specials", a structured response is generated by the business/services finder application 62 that provides information about Chinese restaurants on the upper north side of Atlanta, and not Chinese restaurants located in irrelevant geographic locations, such as the far south side of Atlanta.

As previously set forth, in yet another preferred embodiment of the location-based services system 10 a user of the second remote terminal 40 is connected to a subscriber web portal server 44. The second remote terminal 40 and the subscriber web portal server 44 are designed to communicate with each other using standard web-based protocols (e.g.— HTML). The subscriber web portal server 44 is connected to the location-based application server 28, thereby providing the second remote terminal 40 with access to the business services and enhanced directory assistance services that are offered in the preferred embodiments of the present invention.

The second remote terminal 40 is capable of providing voice or keypad input data to the subscriber web portal server 44. As previously set forth, for voice signals the respective vocal responses are sent to the voice recognition servers 24 for processing and, in the case of keypad input data, the subscriber portal web server 44 is operable to generate structured requests in response to user requests received from the second remote terminal 40 in similar manners as set forth above. The preferred location-based services system 10 is capable of allowing its subscribers to take advantage of the services provided by the present invention in a non-wireless environment as well, by supporting the use of standard computing devices that are typically used at home or work.

As such, by way of example only, lets say a user of the second remote terminal 40 is located in Atlanta, Ga., and wants to find local deals on Polo merchandise as well as stores that carry this particular brand that are located near their respective geographic location. In the case of a keypad input search, the user would be prompted for a search request from a web page generated on the second remote terminal 40 where they would enter their desired search parameters, which in the present example might be in the form of the words "POLO MERCHANDISE".

After the search request is entered and the user is ready to send the request, there is also preferentially an icon or some other type of selection indicator that is generated on a web page being displayed on the second remote terminal 40 that allows the user to submit the request. Once this is selected, the search request, a second remote terminal identifier and a geographic indicator are sent to the subscriber web portal server 44. The subscriber web portal server 44 then transforms the search request into a structured search request that is sent to the location-based application server 28, which processes the structured request similar to other embodiments of the present invention.

In the case of a voice signal input being used, the user would be prompted to state their respective request much like in the example set forth above with relation to wireless remote terminal 12. As such, in the case of our present example, the user would state "POLO MERCHANDISE" after being prompted for a business services request. This vocal response is sent to the voice recognition server 24, which as previously set forth, processes the vocal response similar to other embodiments herein described.

As such, in our present example, a user of the second remote terminal 40 would be provided with a structured response from the location-based application server 28 that contained information relating to businesses that sell Polo merchandise in a geographic location that is relatively close to the second remote terminal 40. In fact, in every embodiment of the present invention, the user may also be given option of selecting a predetermined geographic radius for which they wish responses to be generated during operation. By way of example only, a respective user may only desire to obtain information on businesses located within 15 miles of the remote terminals 12, 40 and as such, may set a setting provided on the remote terminal 12, 40 that only allows responses to business services requests to be generated within a 15 mile radius of the remote terminal 12, 40.

Referring once again to FIG. 1, a wireless carrier 70 may also be connected to the data files 54-60 through a wireless carrier server 72. The wireless carrier server 72 is preferentially operable to monitor the data that is contained in the data files 54-60. As such, during operation of the location-based services system 10 the wireless carrier server 72 can update a subscriber data file 74 as users of the remote terminals 12, 40 access the location-based services system 10. This allows the wireless carrier 70 to keep track of the usage of the location-based services system 10 and may allow various charges to be applied to the user if applicable.

Figure 3:
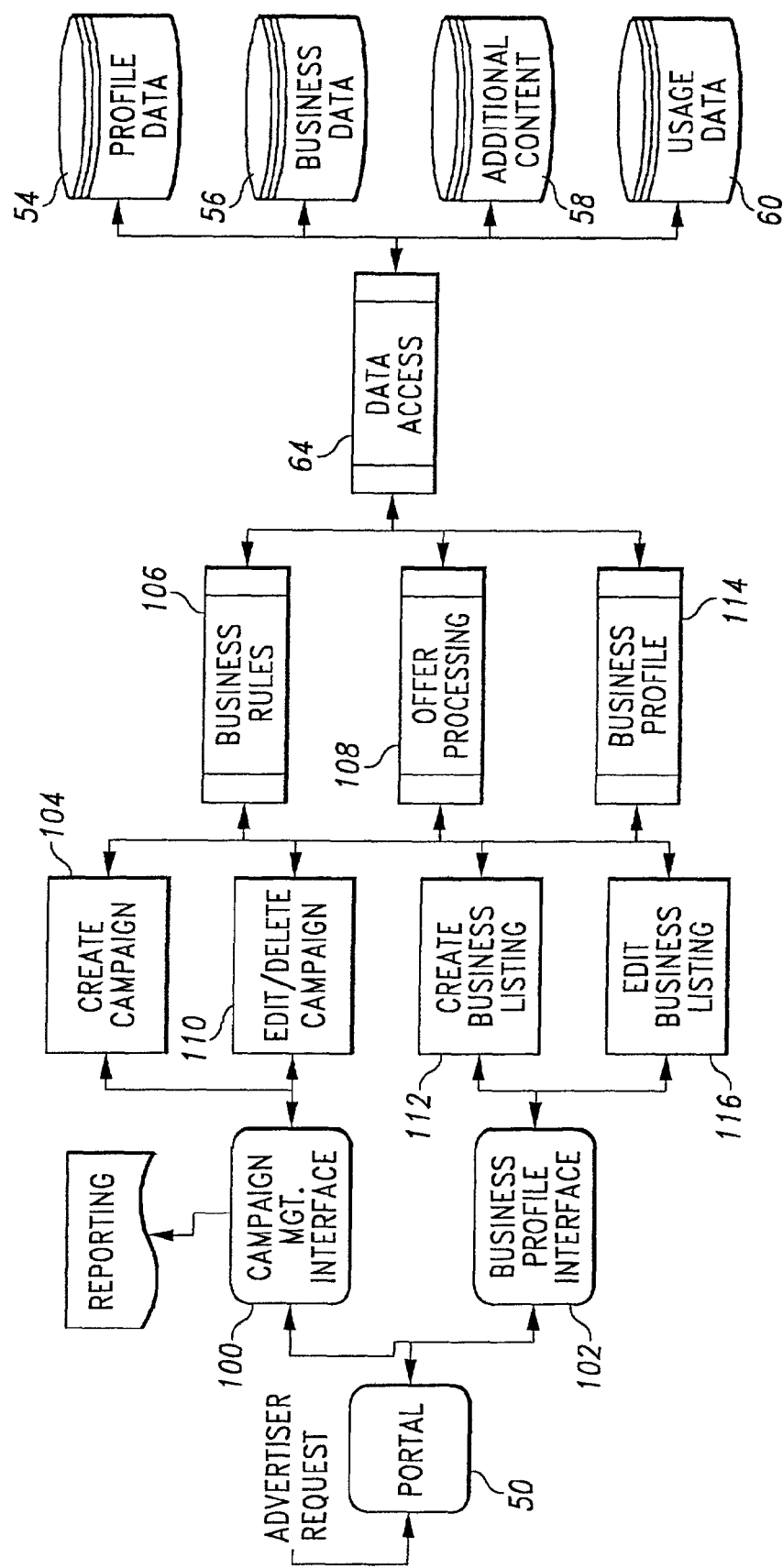
FIG. 3 illustrates a preferred method and system for managing, creating and editing advertising campaigns and business listings in a location-based services system.

Referring to FIG. 3, wherein like numbered references refer to common elements found throughout the figures, another preferred embodiment of the present invention enables a business user or advertiser via a web connected business terminal 46 to access the location-based services system 10 to create and manage advertising campaigns and business listings. This is preferentially accomplished with a web based user interface that provides the user with the ability to create and manage advertising content and business listings. As such, business owners that subscribe to the location-based services system 10 are capable of creating, modifying or deleting advertising content or business listings that are provided to users of the location-based services system 10 at their respective business location. As such, a business owner does not necessarily have to contact the owner or operator of the location-based services system 10 in order to create, modify or delete advertising campaigns or business listings.

As illustrated in FIGS. 1 and 3, the business advertiser would preferentially access the advertiser portal 50 through a web browser and the advertiser portal 50 would serve as a gateway to the location-based services system 10. Business data is captured through the advertisers interaction with the advertising portal 50 using the business remote terminal 46. Preferentially, there are at least two applications within the advertiser portal 50 that provide the user with the ability to select, view, add, edit and delete advertising campaigns or business listings. The preferred advertiser portal 50 includes a campaign management interface application 100 and a business profile interface application 102. Within each of these applications 100, 102 there are preferentially two options available to the business user.

As set forth in greater detail below, the campaign management interface application 100 allows the business user to create campaigns, edit campaigns and delete campaigns. The business profile interface application 102 allows business users to create business listings and edit business listings. The applications that support the above-referenced applications include a business rule application, an offer processing application, a business profile collection application and a data access application, which are described in the following sections.

Advertising campaigns differ from business listings in the preferred embodiment of the present invention. Generally speaking, an advertising campaign is directed toward specials, discounts or deals that are available on specific products or services that are provided by business subscribers of the location-based services system 10. Business listings relate to a broad range of information that are provided by business users that might include a business name, address, product type(s), service type(s), menu(s), brand type(s), pricing information, model type(s) and hours of operation, for instance. Business listings will tend to remain static while advertising campaigns will tend to only run for predetermined periods of time. For example, a pizza restaurant may offer large pepperoni pizzas in their business listings all the time, but may only run specials on these pizzas once per month.

A create campaign application 104 on the advertiser portal 50 captures data from the campaign management interface application 100, which is used to capture data from the advertiser in order to create a location-based advertising campaign. During operation, the campaign management interface application 100 preferentially generates a web-based user interface that allows the business user to enter detailed parameters for the campaign on their respective business remote terminal 46. As such, an advertising campaign parameter entry form is preferentially generated on the business remote terminal 46 to allow the business user to enter advertising parameters.

Once the advertising parameters are entered, the information is sent to the campaign management interface application 100, which forwards the information to the create campaign application 104 and a business rules application 106. If the customer enters in specific deal information along with the advertisement, the create campaign application 104 and an offer processing application 108 will be used to process the request. After each respective application processes the advertising campaign, it is then stored in the business database 56 with the assistance of the data access component 64.

An edit/delete campaign application 110 can also be accessed through the campaign management interface application 100 that allows the advertiser to modify or delete an existing advertising campaign. When the advertiser selects this option, a list of existing campaigns will be retrieved and displayed on the web browser of the business remote terminal 46, which is generated by the advertiser portal 50. If the advertiser desires to modify a respective campaign, they would select the campaign in a list and the campaign data entry fields would then be presented. The advertiser can then edit the parameters for a campaign and submit the changes. This information is then passed to the edit/delete campaign application 110 and the business rule application 106 for processing into the business database 56.

The preferred embodiment also allows the business remote terminal 46 to delete entire campaigns. During operation, when the advertiser wishes to delete a respective campaign, the advertiser would select the campaign in a list of campaigns being run by the advertiser and the campaign data entry fields are preferentially presented in an interactive manner via the advertiser's web browser. Once the appropriate campaign is selecting, the advertiser can select a delete option presented on the web browser in order to delete the campaign, or possibly a section of a larger campaign. A respective advertiser will send this information, preferentially via the Internet, to the edit/delete application 110 and the campaign is then deleted from the business database 56.

The advertiser portal 50 also includes a business profile interface 102 that has a create business listing application 112 that captures data from the advertiser in order to create a location-based business listing. First, the advertiser enters the business listing data into the user interface created by the business profile interface 102 and then submits the information for processing by the advertiser portal 50. Preferentially, a business listing entry form is generated on the business remote terminal 46 that allows the business user to enter business listing data that is associated with their respective line of business.

Once the advertiser portal 50 receives the business listing data, it is directed to the create business listing application 112, which is responsible for the creation of business listings based on the business user's inputs to the business listing entry form. The information is also directed to various applications including a business profile application 114 and the business rules application 106. The business listing information is then sent to the data access component 64 in order to store the business listing data into the business database 56.

An edit business listing application 116 allows the advertiser to update a location-based business listing. When editing business listings, the advertiser enters data into the user interface and submits the information for processing. The edited information is then sent to various applications including the business profile application 114 and the business rules application 106. The data access component 64 receives this information from the advertiser and updates the appropriate business listing data within the business database 56.

As previously set forth, the applications that support applications 104, 110, 112 and 116 include the business rules application 106, the offer processing application 108, the business profile application 114 and the data access component 64. The business rules application 106 is a collection of parameters associated with a campaign or listing that has been created with the location-based service system 10. The parameter information captured is utilized in the implementation of the advertising campaign or the business listing. An example of parameter information might include: For the '2 for 1 drink special', target men between 21-35 that request a bar or restaurant in Atlanta. The business rules application 106 allows the advertiser to target specific types of users of the location-based services system 10 that have predetermined types of characteristics or fall within a general category.

The parameter information that can be used will preferentially be divided into five categories, which include demographic targeting restrictions, target market restrictions, location restrictions, length of time restrictions and historical interaction restrictions. The demographics targeting restrictions may include, but are not necessarily limited to: gender; age; ethnicity; marital status; children; income; special interests; hobby; education; homeowner; and car owner. The target market restrictions preferentially include city and state information. Location restrictions may include address and radius from remote terminal 12 and consumer terminal 40. The length of time for the campaign restrictions may include such parameters as start date and end date. The historical interaction restriction parameters may include areas, categories and types of listings that respective remote terminals 12 and consumer terminals 40 have accessed.

The offer processing application 108 processes the information associated with creating a deal or a special offer. As set forth above, during operation the advertiser provides the create campaign application 104 and the edit/delete campaign application 110 with a detailed description of the deal, the market for the deal as well as parameters or rules associated with the deal using the business rules application 106. The offer processing application 108 processes the data entered from the create campaign application 104 or the edit/delete campaign application 110 before it is passed to the data access component 64.

The business profile application 114 is responsible for collecting the advertiser profile information. This information is used to create a business profile listing for the advertiser. This information preferentially includes, but is not necessarily limited to, the following: business name; business category; product types; service type(s); franchise; business e-mail address or URL; product name(s) and/or model name(s); identification code(s); product brand(s); price(s); location address; hours of operation and category listing selections. As such, the business profile application 114 allows the advertiser to use the business remote terminal 46 to send profile listing information to the advertiser portal 50, which forwards it to the data access component 64 for storage in the profile database 54. The data access component 64 is used to access databases 54-60, which hold all of the location-based service network information. This component is used to retrieve data as well as enter data into respective databases 54-60. Data may also be deleted from any respective database as well.

Although not illustrated, another preferred embodiment of the present invention allows a wireless business remote terminal to access the advertising campaigns and business listings that have been created by respective advertisers. In this embodiment, the wireless business remote terminal would be connected to a base station that includes a wireless application protocol gateway. The wireless application protocol gateway would allow the wireless business remote terminal to access and interact with the content 52 of the location-based services system 10. As such, if an advertiser was not located at a conventional desktop computer system, they would still be able to create, edit and delete advertising campaigns and business listings from a wireless communication device.

While the invention has been described in its currently best-known modes of operation and embodiments, other modes, embodiments and advantages of the present invention will be apparent to those skilled in the art and are contemplated herein.

What is claimed is:

1. A method for creating advertising content and providing said advertising content in a communication network, comprising:

storing user specific information of a plurality of consumer subscribers that are subscribed to a location-based services system as patrons and a plurality of business subscribers that are subscribed to said location-based services system as advertising customers of said location-based services system;

said location-based services system transmitting an advertising campaign parameter entry form over a publically accessible unsecure network for receipt by a business remote terminal of one of said business subscribers;

receiving with said location-based services system over said publically accessible unsecure network advertising campaign parameters entered into said advertising campaign parameter entry form with said business remote terminal by said one of said business subscribers, said advertising campaign parameters comprising a detailed description of an offer designed to promote and sell a particular product or service of said one of said subscriber businesses, specification of a mechanism of delivery of said offer to said consumer subscribers for said particular product or service, specification of a geographic location or region where said consumer subscribers must be geographically located to receive said offer, and specification of a specific category of consumer subscribers to which said offer is targeted;

creating one or more specific promotions for said particular product or service with said location-based services system based on said advertising campaign parameters;

said location-based services system receiving over said publically accessible unsecured network from a wireless remote terminal of one of said consumer subscribers a request for information related to goods or services;

said location-based services system determining a current geographic location of said wireless remote terminal of said one of said consumer subscribers in response to receipt from said wireless remote terminal of said request for information related to goods or services, confirming with said location-based services system, in response to receipt from said wireless remote terminal of said request for information related to goods or services and an identifier of said one of said consumer remote terminals included with said request, that said current geographic location of said wireless remote terminal is within said specified geographic location or area;

confirming with said location-based services system in response to receipt from said wireless remote terminal of said request for information related to goods or services and said identifier of said one of said consumer remote terminals included with said request that said one of said consumer subscribers of said remote terminal is within said specific category of consumer subscribers based on said stored user specific information of said one of said consumer subscribers; and said location-based services system transmitting over said publically accessible unsecured network a geographically targeted response and said one or more specific promotions for receipt by said wireless remote terminal in response to said request and confirmation said current geographic location of said wireless remote terminal is in said specified geographic location or area and said one of said consumer subscribers of said remote terminal is within said specific category of consumer subscribers based on said stored user specific information of said one of said consumer subscribers.

2. The method of claim 1, wherein said advertising campaign parameter entry form is generated with a campaign management interface application.

3. The method of claim 1, wherein said advertising campaign parameters are received with said location-based services system as a mark-up language file.

4. The method of claim 1, wherein said advertising campaign parameter entry form is generated with a web browser.

5. The method of claim 1, further comprising said location based services system providing an edit campaign capability that allows said business remote terminal to edit said advertising campaign parameters.

6. The method of claim 1, further comprising said location based services system providing a delete campaign capability that allows said business remote terminal to delete said advertising campaign parameters.

7. The method of claim 1, wherein said business remote terminal is a wireless communication device.

8. A communication network with an advertising campaign creation management application, comprising:

a location-based application server computer in communication over a publically accessible unsecured network with a plurality of consumer remote terminals, said consumer remote terminals operable by consumer subscribers that are subscribers to said location-based services system as patrons, said location-based application server computer configured to determine a geographic location of one of said consumer remote terminals in response to receipt from said one of said consumer remote terminals of a request for information related to goods or services, said geographic location set by one of said consumer subscribers operating said one of said consumer remote terminals, or generated to identify a current geographic location of said one of said consumer remote terminals;

an advertiser portal server computer connected to said location-based application server computer;

a campaign management interface application provided through said advertiser portal server computer, said advertiser portal server computer operable to generate an advertising campaign parameter entry form with said campaign management interface application;

said advertising portal server configured to communicate over said publically accessible unsecured network with a business remote terminal, said business remote terminal operable by a business subscriber that is a subscriber to said location-based services system as an advertising customer of said location-based services system, said campaign management interface application accessible from said business remote terminal by said business subscriber, said campaign management interface application responsive to inputs received from said business remote terminal to create one or more specific promotions for a particular product or service that are displayable on said consumer remote terminals, said inputs received by entry of advertising parameters in said advertising campaign parameter entry form, said advertising parameters including specification of a targeted specific category of consumer subscribers, and specification of a geographic region where said consumer subscribers must be geographically located to receive said offer;

a business database configured to store said one or more specific promotions as part of an advertising campaign stored in association with subscriber information of said business subscriber; and a profile data file configured to store specific personal information for each of said consumer subscribers;

said location-based application server computer, responsive to receipt of said request for information related to goods or services from said one of said consumer remote terminals and an identifier of said one of said consumer remote terminals included with said request, is configured to confirm said determined geographic location of said one of said consumer remote terminals is within said specified geographic region;

said location-based application server computer further configured to confirm, in response to receipt of said request for information related to goods or services, and based on stored specific personal information of said one of said consumer subscribers associated with said identifier of said one of said consumer remote terminals, that said one of said consumer subscribers operating said one of said consumer remote terminals from which said request for information related to goods or services is received is within said targeted specific category of consumer subscribers;

wherein said location-based application server computer is further configured to generate and transmit to said one of said consumer remote terminals a geographically targeted response responsive to said request for information related to goods or services, said geographically targeted response including at least one of said one or more specific promotions of said business subscriber, said geographically targeted response generated and transmitted in response to confirmation said determined geographic location of said one of said consumer remote terminals is within said specified geographic region, and confirmation said one of said consumer subscribers operating said one of said consumer remote terminals is within said targeted specific category of consumer subscribers.

9. The communication network of claim 8, wherein said consumer remote terminals are wireless communication devices.

10. The communication network of claim 8, wherein said advertising campaign parameter entry form is generated using a web browser.

11. The communication network of claim 8, wherein said advertising campaign parameter entry form is generated as a mark-up language file.

12. The communication network of claim 8, further comprising a create campaign application provided through said advertiser portal server computer, said advertiser portal server computer operable to extract advertising parameters from said advertising campaign parameter entry form with said create campaign application to create said one or more specific promotions, and said targeted specific category of consumer subscribers.

13. The communication network of claim 8, further comprising an edit campaign application provided through said advertiser portal server computer, said advertiser portal server computer operable to retrieve from storage and display said advertising campaign in response to selection for editing of said stored advertising campaign with said business remote terminal by said business subscriber.

14. The communication network of claim 8, further comprising a delete campaign application provided through said advertiser portal server computer, said advertiser portal server computer operable to delete said advertising campaign in response to selection for deletion of said stored advertising campaign with said business remote terminal by said business subscriber.

15. The communication network of claim 8, wherein said business remote terminal is a wireless communication device.

16. A method for managing the creation of business listings in a communication network, comprising:
    providing location-based services over a publically accessible unsecured network with a location-based services system;
    storing user specific information of a plurality of consumer subscribers that are subscribed to said location-based services system as patrons, and a plurality of business subscribers that are subscribed to said location-based services system as business listing customers of said location-based services system, said user specific information of said consumer subscribers comprising a location-based services information access history of each of said consumer subscribers;
    said location-based services system transmitting a business listing entry form over said publically accessible unsecured network for receipt by a business remote terminal of one of said business subscribers;
    receiving over said publically accessible unsecured network business listing data comprising a description of products or services of said one of said business subscribers, a business name of a business owned by said one of said business subscribers, a geographic location of said business, and conditions for transmitting said business listing data to said consumer subscribers comprising a geographic targeting restriction, and a historical consumer subscriber access restriction, said business listing data and said conditions entered into said business listing entry form using said business remote terminal by said one of said business subscribers;
    creating a business listing with said location based services system based on said business listing data, said business listing descriptive of said products or services of said one of said business subscribers;
    storing said business listing in a business profile database included in said location-based services system, said business listing stored in association with said user specific information of said business subscriber;
    said location-based services system receiving over said publically accessible unsecured network a request for information for goods or services from a wireless consumer remote terminal of a consumer subscriber, and a remote terminal identifier of said wireless consumer remote terminal;
    said location-based services system determining a current geographic location of said wireless consumer remote terminal in response to receipt of said request for information for goods or services,
    said location-based services system determining, in response to receipt of said request for information for goods or services and said remote terminal identifier, if said consumer subscriber meets said historical consumer subscriber access restriction based on said stored location-based services information access history of said consumer subscriber; and
    said location-based services system transmitting a geographically targeted response responsive to said request, said geographically targeted response comprising information extracted from said business listing of said one of said business subscribers having goods or services responsive to said request,
    said geographically targeted response transmitted by said location-based services system in response to said one of said consumer subscribers from which said request is received being determined by said location-based services system to meet said historical consumer subscriber access restriction, and said determined current geographic location of said wireless consumer remote terminal being within said geographic targeting restriction.

17. The method of claim 16, wherein said business listing entry form is generated on a web browser.

18. The method of claim 16, wherein said business listing data further comprises a business category of said one of said business subscribers, a product type of said one of said business subscribers, a service type of said one of said business subscribers, a business URL of said one of said business subscribers, and an operating hours indication of said one of said business subscribers.

19. The method of claim 16, further comprising providing an edit business listing application operable to allow said business remote terminal to edit said business listing after being stored in said business profile database.

20. The method of claim 16, further comprising providing a delete business listing application operable to allow said business remote terminal to delete said business listing after being stored in said business profile database.

21. The method of claim 16, wherein said business remote terminal is a wireless communication device.

22. A communication network with a business listing management interface, comprising:
    a location-based services system connected to a plurality of consumer remote terminals, said consumer remote terminals operable by subscriber consumers who are registered subscribers of said location-based services system;
    a profile data file included in said location-based services system, said profile data file comprising information specific to each of said subscriber consumers comprising a consumer identification, a password, and a subscriber consumer preference;

an advertiser portal server computer connected to said location-based services system;

a business listing interface application included in said advertiser portal server computer, said business listing interface application operable to create a business listing data entry form;

said business listing data entry form configured for use by a business remote terminal connected to said advertiser portal server computer, said business remote terminal operable by a subscriber business that is a registered subscriber of said location-based services system to generate a business listing that is descriptive of said subscriber business, and delivery conditions under which said business listing is selectively directed towards said subscriber consumers of said consumer remote terminals, said business listing and said delivery conditions generated with said business remote terminal in response to receipt of business listing data descriptive of said subscriber business and data delivery restrictions into said business listing data entry form; and a business profile database included in said location-based services system, said business profile database configured to store said business listing in association with information specific to said subscriber business; and said location-based services system operable to identify and provide said business listing to one of said consumer remote terminals in response to a specific purchase request or a specific service request received by said location-based services system from a subscriber consumer of said one of said consumer remote terminals, said business listing identified by said location-based services system from said business profile database based on said specific purchase request or said specific service request and an identifier of said one of said consumer remote terminals received by said location-based services system with said specific purchase request or said specific service request, said location-based services system further operable to determine said subscriber consumer preference and said data delivery restrictions are being met by said information included in said profile data file that is specific to said subscriber consumer identified using said identifier.

23. The communication network of claim 22, wherein said business remote terminal is a wireless communication device.

24. The communication network of claim 22, wherein said business listing data entry form is generated on a web browser.

25. The communication network of claim 22, wherein said business listing data entry form is generated as a mark-up language file.

26. The communication network of claim 22, further comprising a create business listing application included on said advertiser portal server computer, said create business listing application operable to extract said business listing data from said business listing data entry form to create said business listing for said subscriber business.

27. The communication network of claim 22, wherein said business listing data comprises a business name of said subscriber business, a business category of said subscriber business, a product type of said subscriber business, a service type of said subscriber business, a business address of said subscriber business, a business URL of said subscriber business, an address of said subscriber business and an operating hours indication for said subscriber business.

28. The communication network of claim 22, wherein said business profile database comprises a plurality of business listings for each of a plurality of subscriber businesses, said business listings classified according to a predefined geographic region specified with said business listing data by said subscriber businesses so that only consumer remote terminals located within that predefined geographic region are provided said business listings.

29. The communication network of claim 22, further comprising an edit business listing application included on said advertiser portal server computer, said edit business listing application operable to allow said subscriber business, via said business remote terminal, to edit said business listing of said subscriber business.

30. The communication network of claim 22, further comprising a delete business listing application included on said advertiser portal server computer, said delete business listing application operable to allow subscriber business, via said business remote terminal, to delete said business listing of said subscriber business.

31. A method for managing advertising content in a communication network, comprising:

providing location-based services over a publically accessible unsecured network with a location-based services system;

retrieving a predetermined advertising campaign comprising a plurality of advertising parameters and a plurality of advertisements that are specific to products or services of a respective subscriber advertiser that is a registered subscriber of said location-based services system as an advertising customer, said predetermined advertising campaign retrieved with a campaign management interface application located on an advertiser portal transmitting said predetermined advertising campaign to a business remote terminal, said business remote terminal operable by said respective subscriber advertiser;

receiving at least part of said predetermined advertising campaign at said advertiser portal from said business remote terminal, said received at least a part of said predetermined advertising campaign including at least some of said advertising parameters and said advertisements that were changed with said business remote terminal;

processing said changed predetermined advertising campaign with an edit campaign application included in said advertiser portal;

storing said predetermined advertising campaign in a business database in association with specific information of said respective subscriber advertiser;

selecting said predetermined advertising campaign from said business database based on a request for goods or services, a geographic indicator, and an identifier received in connection with said request, said request received from a subscriber terminal of a user that is a registered subscriber of said location-based services system;

said predetermined advertising campaign selected based on substantially matching said advertisement parameters included in said predetermined advertising campaign with a meaning and context of said request, said geographic indicator, and demographic information of said user retrieved from a user profile using said identifier; and transmitting a response to said request for receipt by said user that is said registered subscriber of said location-based services system, said response comprising at least one of said advertisements from said predetermined advertising campaign.

32. The method of claim 31, wherein said business remote terminal is a wireless communication device.

33. The method of claim 31, wherein said view of said predetermined advertising campaign is generated with a web browser.

34. A method for managing business listing content in a communication network, comprising:
providing location-based services over a publically accessible unsecured network with a location-based services system;
retrieving a predetermined business listing comprising a plurality of business listing parameters descriptive of products or services of a respective subscriber business that is a registered subscriber of said location-based services system, said predetermined business listing retrieved with a business profile interface application located on an advertiser portal;
transmitting said predetermined business listing to a business remote terminal, said business remote terminal operable by said respective subscriber business;
receiving at least a portion of said predetermined business listing at said advertiser portal from said business remote terminal, said received predetermined business listing including at least some of said business listing parameters that were changed with said business remote terminal;
processing said changed predetermined business listing with an edit business listing application included in said advertiser portal;
storing said predetermined business listing in a business profile database in association with specific information of said respective subscriber business;
selecting said predetermined business listing from said business database based on a request for goods or services, a geographic indicator and an identifier received in connection with said request, said request received from a subscriber terminal of a user that is a registered subscriber of said location-based services system;
said predetermined advertising campaign selected based on substantially matching at least some of said business listing parameters included in said predetermined business listing with a meaning and context of said request, said geographic indicator, and demographic information of said user retrieved from a user profile using said identifier; and
transmitting a response to said request for receipt by said user that is said registered subscriber of said location-based services system, said response comprising information from said predetermined business listing.

35. The method of claim 34, wherein said business remote terminal is a wireless communication device.

36. The method of claim 34, wherein said view of said predetermined business listing is generated with a web browser.

37. The communication network of claim 8, wherein said advertising campaign entry form comprises capability to receive a discount on products or services of said business subscriber and a predetermined period of time that said one or more specific promotions will be available to said consumer subscribers and creation of one or more specific promotions comprises including said discount and said predetermined period of time in said one or more specific promotions.

38. The communication network of claim 22, wherein said specific purchase request or said specific service request, and a geographic indicator are received from said one of said consumer remote terminals by said location-based services system, and said business listing is identified from said business profile database based on said specific purchase request or said specific service request, said subscriber consumer preference, and said geographic indicator.

39. The method of claim 1, wherein specification of said mechanism of delivery of an offer to said consumer subscribers for said particular product or service comprises specifying with said parameters that said advertising content will be automatically pushed to said consumer subscribers, or that said advertising content will be presented to said consumer subscribers only in response to a request.

40. The method of claim 1, wherein said advertising campaign parameters further include a geographic location restriction comprising an address of said one of said business subscribers and a specified radius from said address.

41. The method of claim 1, wherein said advertising campaign parameters further include target market restrictions comprising city or state information and demographic targeting restrictions.

42. The method of claim 16, wherein said business listing data further comprises specification of a mechanism of delivery of said business listing to said consumer subscribers for said products or services, and said method further comprises said location-based services system transmitting said business listing for receipt by said consumer remote terminal in accordance with said specified mechanism of delivery.

43. The method of claim 16, wherein said location-based services information access history includes areas, categories and types of listings that the respective consumer subscribers have previously accessed.

44. The communication network of claim 22, wherein said specific purchase request or said specific service request received from said location-based services system from a subscriber consumer of said one of said consumer remote terminals is a vocal request spoken using statements commonly used in everyday language, and said location-based services system comprising a voice recognition server computer and a natural language processing server computer configured to process said vocal request, said voice recognition server computer configured to recognize respective words contained in said vocal request, and said natural language processing server computer is configured to interpret the meaning of the recognized respective words and create said specific purchase request or said specific service request as a structured request capable of being further processed by the location-based services system to identify and provide said business listing responsive to said vocal request from said business profile database.

* * * * *

UNITED STATES PATENT AND TRADEMARK OFFICE
CERTIFICATE OF CORRECTION

| | | |
|---|---|---|
| PATENT NO. | : 7,970,648 B2 | Page 1 of 1 |
| APPLICATION NO. | : 10/133536 | |
| DATED | : June 28, 2011 | |
| INVENTOR(S) | : Michael L. Gailey et al. | |

It is certified that error appears in the above-identified patent and that said Letters Patent is hereby corrected as shown below:

In the Specification

In column 10, line 15, please insert --.-- after "traffic".

In column 12, line 39, please delete "to" and insert --the--.

In column 14, line 36, please delete "it" and insert --is--.

In column 15, line 16, please delete "the" and insert --that--.

In the Claims

In column 28, line 33, please insert --;-- after "portal".

Signed and Sealed this
Twenty-third Day of August, 2011

David J. Kappos
*Director of the United States Patent and Trademark Office*